(12) United States Patent
Li

(10) Patent No.: US 12,360,242 B2
(45) Date of Patent: Jul. 15, 2025

(54) LASER RANGING APPARATUS

(71) Applicant: HANGZHOU GREAT STAR INDUSTRIAL CO., LTD., Hangzhou (CN)

(72) Inventor: Yueming Li, Hangzhou (CN)

(73) Assignee: HANGZHOU GREAT STAR INDUSTRIAL CO., LTD., Hangzhou (CN)

( * ) Notice: Subject to any disclaimer, the term of this patent is extended or adjusted under 35 U.S.C. 154(b) by 336 days.

(21) Appl. No.: 18/181,879

(22) Filed: Mar. 10, 2023

(65) Prior Publication Data

US 2023/0305148 A1 Sep. 28, 2023

Related U.S. Application Data

(63) Continuation-in-part of application No. 16/343,665, filed as application No. PCT/CN2017/110715 on Nov. 13, 2017, now Pat. No. 11,604,276.

(51) Int. Cl.
| | |
|---|---|
| *G01S 17/08* | (2006.01) |
| *G01C 9/02* | (2006.01) |
| *G01C 15/00* | (2006.01) |
| *G01S 7/481* | (2006.01) |
| *G01S 7/51* | (2006.01) |

(52) U.S. Cl.
CPC .............. *G01S 17/08* (2013.01); *G01C 9/02* (2013.01); *G01C 15/004* (2013.01); *G01S 7/4813* (2013.01); *G01S 7/4814* (2013.01); *G01S 7/51* (2013.01)

(58) Field of Classification Search
CPC ...... G01S 17/08; G01S 7/4813; G01S 7/4814; G01S 7/51; G01C 9/02; G01C 15/004; G01C 15/002

USPC ........................................................ 356/4.01
See application file for complete search history.

(56) References Cited

U.S. PATENT DOCUMENTS

| | | |
|---|---|---|
| 6,324,888 B1 | 12/2001 | Schmidt |
| 9,151,603 B2 | 10/2015 | Dunne |
| 9,268,011 B2 | 2/2016 | Wolf |
| 2010/0271814 A1 | 10/2010 | Messinger |
| 2012/0069457 A1 | 3/2012 | Wolf |

(Continued)

FOREIGN PATENT DOCUMENTS

| | | |
|---|---|---|
| CN | 201181332 Y | 1/2009 |
| CN | 201689171 U | 12/2010 |

(Continued)

OTHER PUBLICATIONS

CNIPA; Application No. CN201721507085.8, Examination Decision of Request for Invalidation (No. 44019) dated Apr. 13, 2020 (38 pages).

(Continued)

*Primary Examiner* — Md M Rahman
(74) *Attorney, Agent, or Firm* — Fitch, Even, Tabin & Flannery LLP

(57) ABSTRACT

A laser ranging apparatus including: a housing including a first casing; and an inner core comprising a holder and a first measuring part mounted on the holder, the inner core detachably mounted in the first casing, the first casing covering at least part of the inner core, the first measuring part configured to measure a distance using laser light, wherein the laser ranging apparatus is configured so that the inner core is, as a whole, assembled into the first casing or disassembled from the first casing.

26 Claims, 24 Drawing Sheets

(56) References Cited

U.S. PATENT DOCUMENTS

2015/0355328 A1 12/2015 Maryfield
2016/0025482 A1 1/2016 Hoelzlwimmer

FOREIGN PATENT DOCUMENTS

| | | | |
|---|---|---|---|
| CN | 102362195 | A | 2/2012 |
| CN | 203551779 | U | 4/2014 |
| CN | 203551780 | U | 4/2014 |
| CN | 303152602 | S | 4/2015 |
| CN | 105008856 | A | 10/2015 |
| CN | 105526513 | A | 4/2016 |
| CN | 105526514 | A | 4/2016 |
| CN | 205193281 | U | 4/2016 |
| CN | 105954756 | A | 9/2016 |
| CN | 206002691 | U | 3/2017 |
| CN | 304269870 | S | 9/2017 |
| CN | 207366745 | U | 5/2018 |
| CN | 109782293 | A | 5/2019 |
| CN | 211263773 | U | 8/2020 |
| EP | 1503221 | A1 | 2/2005 |
| GB | 2213018 | A | 8/1989 |
| IN | 104597437 | A | 5/2015 |
| JP | H067445 | A | 1/1994 |
| JP | 2012525115 | A | 10/2012 |
| WO | 2010108705 | A1 | 9/2010 |
| WO | 2019090771 | A1 | 11/2017 |

OTHER PUBLICATIONS

CNIPA; Application No. CN201721507085.8 Examination Decision of Request for Invalidation (No. 45739) dated Aug. 7, 2020 (21 pages).
CNIPA/SIPO; Chinese Application No. 201721507085.8; Examination Decision of Request for Invalidation (No. 69432), Mailed Nov. 30, 2022 (34 pages).
SIPO; Chinese Application No. 201721507085.8; Examination Decision Exhibit 7; Notarial certificate of Shenzhen Character No. 62098 (2021) and its attachments, involving the evidence preservation of the website content of JD Finance's crowd-funding project "replacing the tape measure millimeter skyscraper laser" (27 pages).
SIPO; Chinese Application No. 201721507085.8; Examination Decision Exhibit/Evidence 8; Trusted time stamp authentication certificate (TSA-01-20210531100814015ds3Q9n, TSA-01-20210531101033489 8v3n8X) and its original and accessories (the article "Measuring precision small Instrument" published on Sep. 14, 2017 on wechat official account "Billwang Industrial Design" is subject to credible time stamp forensics curing preservation) (18 pages).
SIPO; Chinese Application No. 201721507085.8:Examination Decision Exhibit/Evidence 9; Trusted time stamp authority authentication certificate (TSA-01-20210531101738 4774tR6dz, TSA-01-20210531101858665qxa24s) and its attachments of the original, (the article "Very yellow and very violent skyscraper laser ruler m1" published by user "Curry" on Jiguo network in 2017 was subject to credible time intercepting forensics curing preservation) (22 pages).
SIPO; Chinese Application No. 201721507085.8:Examination Decision Exhibit/Evidence 10; Trusted time stamp authentication certificate (TSA-01-20210531102520496v79R93, TSA-01-202105311027089661894tl) and its attachments issued by the Joint Trust Time Stamp Service Center, which relates to the user's "love to eat the seed . . . " (the video "The small artifact that replaces the tape measure—Skyscraper Laser ruler" released on iQiyi carries out credible time stamp forensics curing preservation) (16 pages).
SIPO; Chinese Application No. 201721507085.8:Examination Decision Exhibit/Evidence 11; Notarial certificate of Shenzhen No. 62097(2021) and its attachments, involving the on-site delivery process of Yunda Express package (tracking No. 4314786004771) and the evidence preservation of the obtained documents of goods (23 pages).
SIPO; Chinese Application No. 201721507085.8:Examination Decision Exhibit/Evidence 12; Trusted time stamp authentication certificate(TSA-01-20210531113314326TC4000, TSA-01-20210531113543836dA5z7x) and its original and accessories (it involves making reliable time-stamp forensics and curing preservation of the shop information, order details and chat records with the customer service about the antenna laser rangefinder purchased by the user "Thorn Bird got a good score" at the flagship shop of myantenna on Taobao.com) (17 pages).
SIPO; Chinese Application No. 201721507085.8:Examination Decision Exhibit/Evidence 13;Shenzhen VAT Electronic ordinary invoice, invoice code is 044032000211, invoice No. is 74229807, invoice date is May 31, 2021, and the buyer's name is Shenzhen Yishui Electronic Technology Co., LTD. ( the name of the goods is "geodetic instrument yantenna laser rangefinder measuring room instrument high precision laser ruler mini electronic ruler Measuring ruler", the seller's name is Shenzhen Skyflyer Radio Frequency Technology Co., LTD.,) (1 page).
SIPO; Chinese Application No. 2014208631318; Examination Decision Exhibit/Evidence 14; No. 36818 Invalidation Request Review decision made by the State Intellectual Property Office; Mailed Jul. 30, 2018 ( 33 pages ).
App. No. PCT/CN2017/110715; International Search Report mailed Jul. 5, 2018.
JP Office Action from Application No. JP2022-032410; mailed Jun. 1, 2023; in Japanese with English translation (6 pages).

LASER RANGING APPARATUS

RELATED APPLICATIONS

This application is a continuation-in-part (CIP) application claiming benefit of U.S. patent application Ser. No. 16/343,665, which is a national phase application of PCT/CN2017/110715 filed on Nov. 13, 2017, the disclosures of which are incorporated herein in their entirety by reference.

FIELD OF THE INVENTION

The present invention relates to the field of measuring tools and, in particular to a laser ranging apparatus.

DESCRIPTION OF THE PRIOR ART

Laser range finder is a common non-contact ranging tool and can be used in construction, interior decoration, traffic accident handling and other fields. The laser range finder of the prior art generally integrates a core assembly directly into a casing. The core assembly of the laser range finder is a precision component requiring high precision in the assembly process. The manufacture or maintenance of the laser range finder needs to be performed by professionals, and each assembly needs testing and precision adjustment to ensure the ranging precision in use, which is low in product production efficiency and troublesome in rework operations. Because ordinary users have difficulties in performing precision testing and adjustment, the laser range finder cannot be disassembled and repaired by ordinary users. Otherwise, the ranging precision will be affected and the error will be larger.

In addition, the core assembly and other components of the laser range finder are mostly irregular shape components, and the casing needs to be arranged with a plurality of part mounting grooves, so that the shapes thereof are suitable for various components. The production process of the casing is complicated, the production cost is high, the production efficiency is low, and the productivity is limited to a certain extent.

SUMMARY OF THE INVENTION

An objective of the present invention is to provide a laser ranging apparatus which solves the problems of inconvenient assembly of the casing, complex process of the casing, high production cost and low production efficiency of the laser ranging apparatus in the prior art.

In order to solve the above technical problem, the present invention provides a laser ranging apparatus, including: a holder, a measuring part mounted to the holder, and a housing detachably connected to the holder, wherein the housing includes a first casing, the first casing is an integrally formed tubular structure detachably sleeved outside the holder.

Further, in various embodiments, the housing further includes a second casing and a third casing respectively detachably connected to two ends of the first casing.

Further, in various embodiments, two ends of the first casing are respectively provided with a first opening and a second opening; the second casing is detachably mounted to the first opening of the first casing; one end of the holder is inserted into the first casing via the second opening, the other end of the holder extends to the outside of the second opening, and is detachably connected to the third casing.

Further, in various embodiments, the laser ranging apparatus further includes a groove provided on an outer sidewall of the holder; and a rib protruding from an inner sidewall of the first casing and slidably inserted into the groove.

Further, in various embodiments, the shape of the holder is elongated, and the shape of the housing is a straight cylinder.

Further, in various embodiments, the holder includes a first mounting groove disposed opposite to the second casing, and a second mounting groove disposed opposite to the third casing.

Further, in various embodiments, the laser ranging apparatus further includes a display device mounted to the holder; and a button switch mounted to the holder, wherein the display device and the button switch are connected to the measuring part and/or at least one battery through wires.

Further, in various embodiments, the holder includes a third mounting groove recessed on a sidewall of the holder for mounting the display device; and a fourth mounting groove recessed on a sidewall of the holder for mounting the button switch; the first casing includes a first casing body; a first groove recessed on a surface of one side of the first casing body; a first through hole penetrating through a bottom surface of the first groove and disposed opposite to the display device; and a second through hole penetrating the bottom surface of the first groove and being penetrated by a portion of the button switch.

Further, in various embodiments, the laser ranging apparatus further includes a transparent cover mounted in the first groove and having a portion disposed opposite to the first through hole; and a cover through hole penetrating one end of the transparent cover and disposed opposite to the second through hole; and the second through hole and the cover through hole are sequentially penetrated by a portion of the button switch.

Further, in various embodiments, the measuring part includes a laser generating device having a first laser port facing the first opening of the first casing; and a photoelectric conversion device having a second laser port facing toward the first opening of the first casing; and the second casing includes a second casing body; a third through hole penetrating through the second casing body and disposed opposite to the first laser port; and a fourth through hole penetrating the second casing body and disposed opposite to the second laser port.

Further, in various embodiments, the second casing includes a first locking block protruding from a surface of one side of the second casing body and locked into the first opening of the first casing; a bayonet provided on the first locking block; one end of the rib of the first casing being detachably locked into the bayonet; a second groove surrounded and formed by the first locking block and the second casing body, and a front end of the measuring part being inserted into the second groove.

Further, in various embodiments, the laser ranging apparatus further includes a holder screw hole disposed at a front end of the holder and disposed opposite to the second casing; and a fifth through hole penetrating through the second casing body and disposed opposite to the holder screw hole; and a screw connected to the holder screw hole through the fifth through hole.

Further, in various embodiments, the laser ranging apparatus further includes a locking groove provided on an inner front wall of a front end of the first casing or the front end of the holder; and a second locking block protruding from a surface of one side of the second casing body and locked into the locking groove.

Further, in various embodiments, the third casing includes a third casing body; a third groove provided on one side of the third casing body with a notch direction facing the first casing body; and an elastic member having one end connected to the bottom of the third groove and the other end connected to a battery in the holder.

Further, in various embodiments, the third casing includes a third casing body; a third groove provided on one side of the third casing body with a notch direction facing the first casing; a second battery detachably mounted in the third groove having one end connected in series to the battery in the holder; and an elastic member having one end connected to the bottom of the third groove and the other end connected to the second battery.

Further, in various embodiments, the laser ranging apparatus further includes a female connector provided at the notch of the third groove; a male connector protruding from one end of the holder and detachably connected to the female connector; and a connector cavity disposed in the male connector and communicating with the second mounting groove.

Further, in various embodiments, the laser ranging apparatus further includes a sheath covering an outer surface of the housing partially or entirely.

Another objective of the present invention is to provide a laser ranging apparatus, so as to solve the problems of the prior art laser ranging apparatus such as large volume, large occupied space and inconvenient portability.

In order to solve the above technical problem, the present invention provides a laser ranging apparatus comprising a housing; the shape and size of two or more cross-sections of the housing are the same; and the cross-sectional shape of the housing includes a circle, an ellipse, a rounded triangle, a rounded rectangle or a rounded polygon.

Further, in various embodiments, the housing has a cross-sectional height in the range of 14-22 mm; and the housing has a cross-sectional width in the range of 18-25 mm.

Further, in various embodiments, when the cross-section of the housing is circular, the diameter of the cross-section of the housing in the range of 18-28 mm; and when the cross-section of the housing is an oval, a rounded triangle, a rounded rectangle or a rounded polygon, the diameter of the inscribed circle of the cross section of the housing is in the range of 18-20 mm and the diameter of the circumscribed circle in the cross section of the housing is in the range of 20-28 mm.

Further, in various embodiments, the laser ranging apparatus further includes a measurement display part composed of a measurement part and a display device; the cross-sectional height of the measurement display part is in the range of 10-12 mm; the cross-sectional width of measurement display part is in the range of 15-17 mm; and the length of the measurement display part is in the range of 39-45 mm.

Further, in various embodiments, the ratio of the cross-sectional width of the measurement display part to the cross-sectional width of the housing is in the range of 0.6-0.8; the ratio of the cross-sectional height of the measurement display part to the cross-sectional height of the housing is in the range of 0.6-0.8; and the ratio of a cross-sectional area of the measurement display part to the cross-sectional area of the housing is in the range of 0.67-0.8.

Further, in various embodiments, the laser ranging apparatus further includes a battery disposed in the housing; the battery includes a button battery or a columnar battery; when the battery is a button battery, the length of the housing is in the range of 60-70 mm; and when the battery is a columnar battery, the length of the housing is in the range of 95-150 mm.

Further, in various embodiments, the material of the housing is aluminum alloy, plastic, nylon material or carbon fiber material.

It is a further object of the present invention to present a laser ranging apparatus, in which the accuracy of a measuring part set at the time of its delivery from the factory will not be affected during assembly or disassembly of the measuring part, and the assembly can be accomplished in a rapid and easy fashion.

To this end, the present invention provides a laser ranging apparatus, including:
  a housing including a first casing;
  an inner core including a holder and a first measuring part mounted on the holder, the inner core detachably mounted in the first casing, the first casing covering at least part of the inner core, the first measuring part configured to measure a distance using laser light;
  wherein the laser ranging apparatus is configured so that the inner core is assembled into the first casing, or disassembled from the first casing, as a whole.

Further, the first casing is cylindrical in shape and has at least one opening, wherein the inner core is assembled into the first casing or disassembled therefrom through the opening, as a whole.

Further, the laser ranging apparatus includes a locating structure configured to locate the inner core in an axial direction of the first casing during the assembly of of the inner core into the first casing.

Further, the locating structure includes a holder baffle disposed on the holder, which comes into abutment against an end of the first casing during the assembly of the inner core into the first casing, thereby locating the inner core in the axial direction of the first casing.

Further, the laser ranging apparatus includes a clamping member having a portion fixedly connected to the holder or the first casing and a portion disposed on an outer surface of the first casing.

Further, the clamping member includes a stopper portion and a movable portion, the stopper portion fixedly connected to the holder or the first casing, one end of the movable portion joined to the stopper portion, another end of the movable portion disposed on an outer surface of the first casing and being movable.

Further, the stopper portion is disposed over the holder and located between the holder baffle and the first casing.

Further, the stopper portion is disposed over the holder and located between the holder baffle and a third casing coupled to one end of the holder.

Further, the locating structure includes a first protrusion disposed at one end of the holder and a first notch provided in the first casing and is configured so that the first protrusion engages into the first notch during the assembly of the inner core into the first casing, thereby locating the inner core in the axial direction of the first casing.

Further, the locating structure includes a snap disposed on a side wall of the holder and a recess provided in the first casing, the snap configured to snap into the recess during the assembly of the inner core into the first casing, thereby locating the inner core in the axial direction of the first casing.

Further, the first casing is composed of a plurality of portions which are joined together.

Further, the first casing includes a left shell and a right shell, the left shell coupled, at one end in a lengthwise direction thereof, by a connecting member, to one end of the right shell at a lengthwise direction thereof.

Further, the left shell is provided with a first through hole, wherein the right shell is provided with a second through hole, and wherein the connecting member comprises a first connecting portion insertable into the first through hole, a second connecting portion insertable into the second through hole and a transverse portion joined to both the first connecting portion and the second connecting portion.

Further, each of the left shell and the right shell is mounted therein with one inner core, making the laser ranging apparatus capable of laser ranging at both ends.

Further, the laser ranging apparatus further includes a second measuring part.

Further, the second measuring part includes a laser line projection component, which includes a laser line projection port arranged in the housing and is configured to measure a degree of levelness and an angle.

Further, the second measuring part includes a temperature measurement member configured to measure a temperature.

Further, the second measuring part includes a humidity sensor, wherein the first casing is provided with vent holes for causing circulation of air through the humidity sensor to enable it to measure humidity thereof.

Further, the second measuring part includes an electronic level mounted on the holder as part of the inner core.

Further, the inner core is provided with a circular display device, and the first casing is provided with a circular through hole in positional correspondence with the circular display device, wherein once the inner core is mounted in place in the first casing, the circular display device opposes the circular through hole, and wherein the circular display device is configured to display thereon an angle value and an electronic bubble.

Further, the laser ranging apparatus includes at least one display device mounted on the inner core, and a through hole is provided in the first casing in positional correspondence with the display device.

Further, the laser ranging apparatus includes a first display device disposed on a front side of the inner core and a second display device disposed on a lateral side perpendicular to the front side.

Further, the laser ranging apparatus includes a first display device disposed on a front side of the inner core and a second display device disposed on a back side opposing the front side.

Further, the inner core is further provided thereon with a battery.

Further, the battery is a rechargeable battery.

Further, the housing is provided therein with a charging port, which is electrically connected to the rechargeable battery in order to charge the rechargeable battery.

Further, the laser ranging apparatus includes an inductive charger, and the housing is provided with an inductive charging area. The inductive charger is configured to charge the lithium battery in a wireless manner.

An advantage of the present invention is to provide a laser ranging apparatus for fixedly mounting a measuring component on a holder and installing a detachable casing on the outside of the holder so as to ensure that the position of the measuring component will not be moved during the disassembly and assembly of the casing and the ranging precision of the measuring part will not be affected. The casing of the laser ranging apparatus is composed of several components of simple shapes, which can effectively reduce the process difficulty of the casing components. Meanwhile, the assembly and disassembly of the casing are simple and convenient, the production efficiency is improved, the production cost is reduced, and the productivity is increased. The laser ranging apparatus has a smaller size, compact structure, less space occupied, easy for users to carry, and good anti-shock performance and hand feeling.

Figure 1:
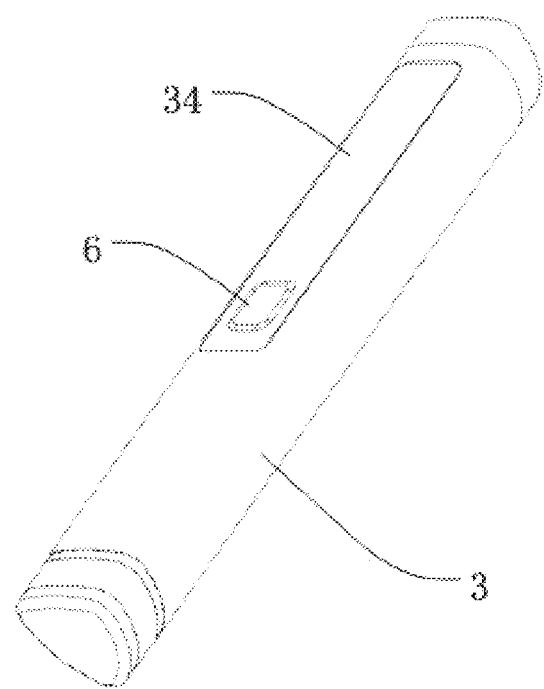
FIG. 1 is a schematic diagram of an overall structure of Embodiment 1 of the present invention.
Figure 2:
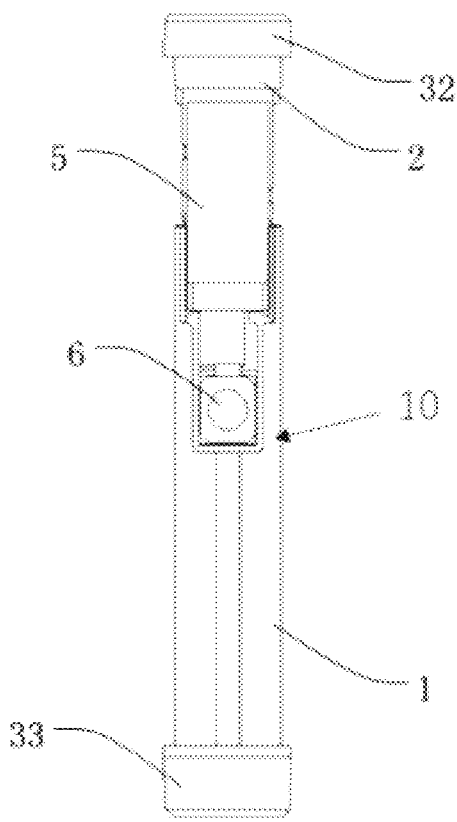
FIG. 2 is a front structural diagram of Embodiment 1 of the present invention after removing the first casing.
Figure 3:
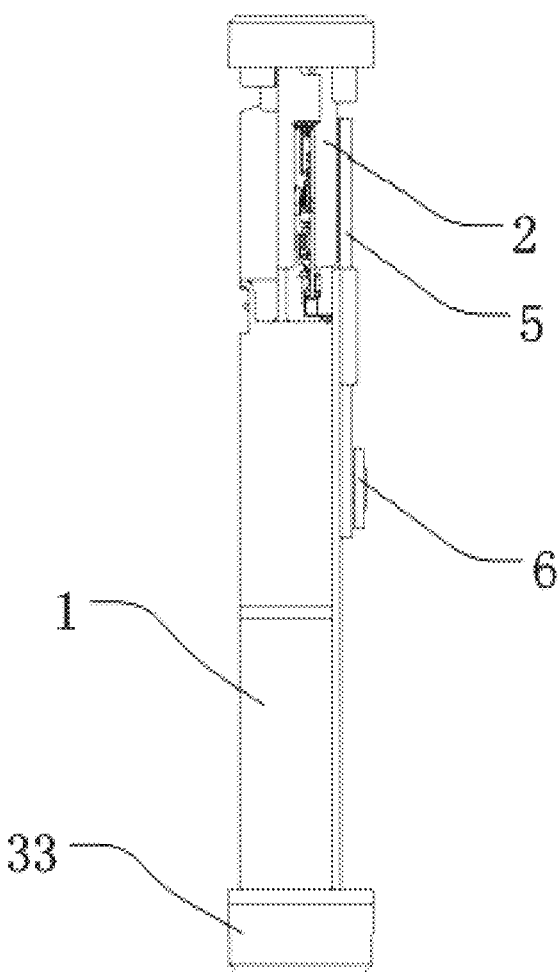
FIG. 3 is a left structural diagram of Embodiment 1 of the present invention after removing the first casing.

LIST OF REFERENCE NUMERALS IN DRAWINGS 1 holder; 2 measuring part; 3 housing; 4 battery; 5 display device; 6 button switch;
7 sheath; 8 second battery;
10 inner core; 11 first mounting groove; 12 second mounting groove; 13 third mounting groove; 14 fourth mounting groove; 15 groove;
16 male connector; 17 connector cavity; 18 holder screw hole;
21 core assembly; 22 laser generating device; 23 photoelectric conversion device;
31 first casing; 32 second casing; 33 third casing; 34 transparent cover;
35 first opening; 36 second opening; 37 holder baffle; 38 screw;
61 switch base; 62 button; 63 switch contact;
101 fin; 121 metal contact; 122 metal ring; 123 bus;
221 first laser port; 222 second laser port;
301 gap; 302 cavity; 311 rib; 312 first groove; 313 first through hole; 314 second through hole;
321 second casing body; 322 third through hole; 323 fourth through hole; 324 first locking block;
325 second groove; 326 bayonet; 327 locking groove; 328 second locking block; 329 fifth through hole;
331 third casing body; 332 third groove; 333 elastic member; 334 female connector;
341 cover through hole;
401 clamping member; 402 annular member; 403 clamping portion; 404 groove;
510 first casing; 511 cavity; 512 first end of first casing; 513 second end of first casing; 514 first opening; 515 second opening; 516 first housing through hole; 517 second housing through hole; 518 first notch; 519 second notch; 520 lip; 521 depression; 530 second casing; 531 fastener; 532 second protrusion; 541 front end of holder; 542 rear end of holder; 543 first mounting groove; 544 laser port; 545 second mounting groove; 546 radial lip; 547 first protrusion; 550 first circuit board; 551 button; 552 second circuit board; 553 charging port; 554 button frame; 555 button cap; 556 panel; 557 identification block; 558 inductive charging area; 559 panel through hole;
601 recess; 602 snap;
710 left shell; 711 first through hole; 720 right shell; 721 second through hole; 730 connecting member; 731 first connecting portion; 732 second connecting portion; 733 transverse portion; 740 sidewall cover plate; 741 sidewall opening;
801 laser ranging port; 810 laser line projection port; 811 second display device; 812 support interface; 820 vent hole; 830 circular display device; 831 button; 832 angle value; 835 electronic bubble; 840 first casing; 841 circle through hole; 842 button through hole; 843 transparent circular cover plate; 845 first end cap; 846 second end cap; 850 temperature measurement member;
901 second display device.

DETAILED DESCRIPTION OF THE PREFERRED EMBODIMENTS

The preferred embodiments of the present invention are described below with reference to the accompanying drawings, so as to be completely described to those skilled in the art, and its technical content will be clearer and easier to be understood. The present invention can be embodied in many different forms of embodiments, and the protection scope of the present invention is not limited to the embodiments mentioned herein.

In the accompanying drawings, structurally identical components are designated by the same reference numerals, and structurally or functionally similar components throughout drawings are marked with similar reference numerals. The directional terms referred to in the present invention, such as "up", "down", "front", "rear", "left", "right," "inside", "outside", and "side" are merely the directions in the drawings and are used for illustrating and describing the the present invention, but not intended to limit the protection scope of the present invention.

When a certain component is described as being "on" another component, the component may be placed directly on the other component; or there may be an intermediate component on which the component is placed, and the intermediate component is placed on the other component. When a component is described as "mounted to" or "connected to" another component, both can be understood as being directly "mounted" or "connected," or a component may be indirectly "mounted to" or "connected to another component via an intermediate component.

Embodiment 1

As shown in FIGS. 1 to 4, this embodiment provides a laser ranging apparatus including an inner core 10 and a housing 3. The inner core 10 includes at least a holder 1 and a measuring part 2. The measuring part 2 is mounted to the holder 1 by a fixed connection, thereby forming the inner core 10. The housing 3 defines a constant-diameter cavity 302 (see FIG. 9), in which the inner core 10 is detachably received. The housing 3 covers the holder 1 and the measuring part 2 in such a manner that a gap 301 is formed between the housing 3 and the measuring part 2. In this embodiment, the end where the measuring part 2 is provided is defined as a front end. During disassembly or assembly of the housing 3 from or with the holder 1, there is always a gap 301 between the housing 3 and the measuring part 2, which prevents the two coming into contact with each other. In this embodiment, the measuring part 2 is fixedly connected to the holder 1, resulting in the formation of the inner core 10, which is then loaded into the housing 3 as a whole. That is, the measuring part 2 is loaded into the housing 3 together with the holder 1. Moreover, when the holder 1 reaches a predetermined position in the housing 3, it is fixed at the position, and the measuring part 2 is responsively fixed at a corresponding predetermined position in the housing 3. Dismantlement is a reverse process involving first removing the holder 1 from the housing 3 together with the measuring part 2 and then detaching the measuring part 2 from the holder 1. Due to the presence of the gap 301 between the measuring part 2 and the housing 3, during the loading or removal of the holder 1 mounted thereto with the measuring part 2 into or from the housing 3, the measuring part 2 will never come into contact with the housing 3. This is advantageous in that, after accuracy testing and adjustment, the measuring part 2 is fixedly mounted to the holder 1 and will not shift in position relative to the holder 1 when coming into contact or collision with or otherwise affected by another component during the assembly and disassembly of the laser ranging apparatus. This can ensure that the measuring part 2 will not experience a degradation of ranging accuracy due to assembly, disassembly or other reasons. In this way, after the laser ranging apparatus is produced, only one accuracy adjustment process of the measuring part 2 is needed, and another accuracy testing and adjustment process after the final assembly is no longer necessary, making the production effectively easier and more efficient.

Figure 5:
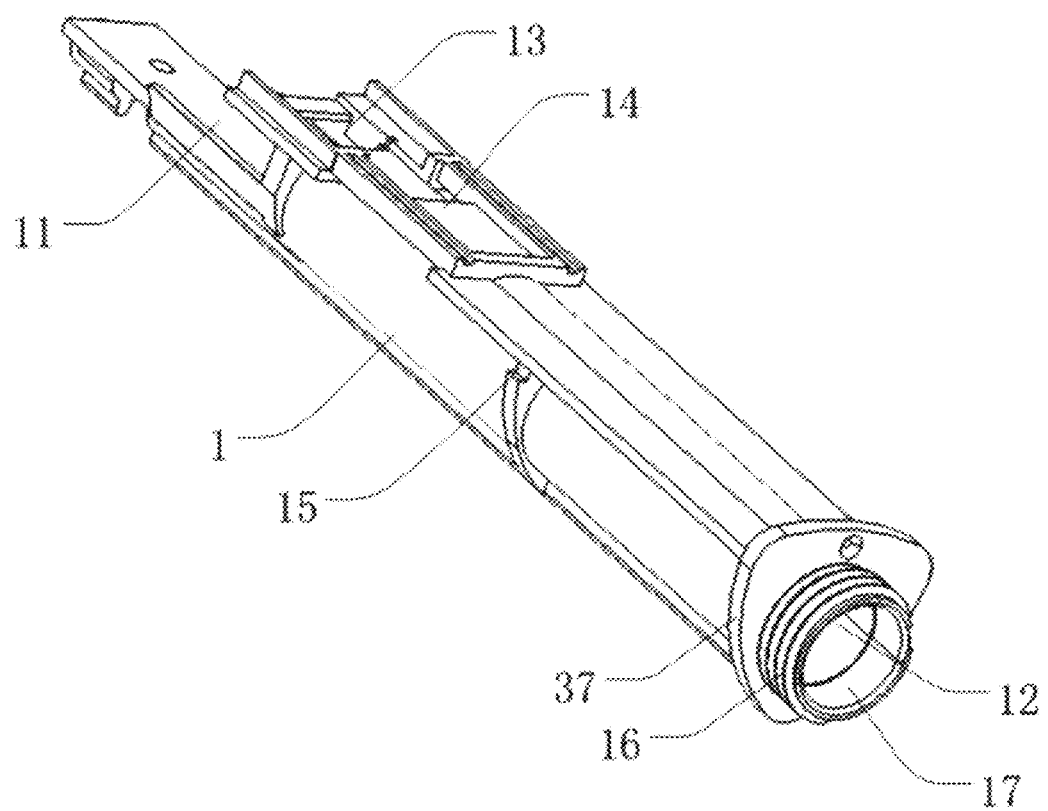
FIG. 5 is a structural diagram of a holder in Embodiment 1 of the present invention.

As shown in FIG. 5, the holder 1 includes a first mounting groove 11, a second mounting groove 12, a third mounting groove 13, and a fourth mounting groove 14. The first mounting groove 11 is disposed on the front end of the holder 1, and the second mounting groove 12 is disposed on the rear end of the holder 1. The third mounting groove 13 and the fourth mounting groove 14 are arranged in parallel on a sidewall of the holder 1.

Figure 6:
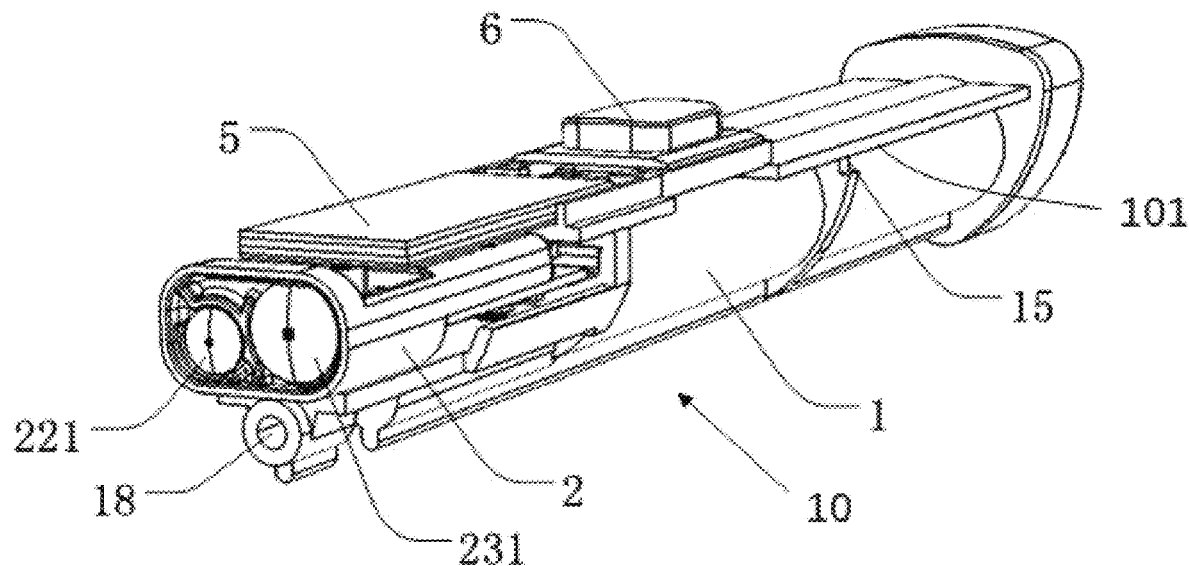
FIG. 6 is a structural diagram of Embodiment 1 of the present invention after removing the housing.

As shown in FIG. 6, the measuring part 2 is fixedly mounted in the first mounting groove 11, and the shape of the first mounting groove 11 is adapted to the measuring part 2. The measuring part 2 comprises a laser range finder core assembly 21, which comprises a laser generating device 22 and a photoelectric conversion device 23, both of which are arranged at the front end of the holder 1 and lie on the same plane.

As shown in FIGS. 1 to 6, this embodiment further includes a battery 4, a measuring part 2, a display device 5, and a button switch 6.

Figure 4:
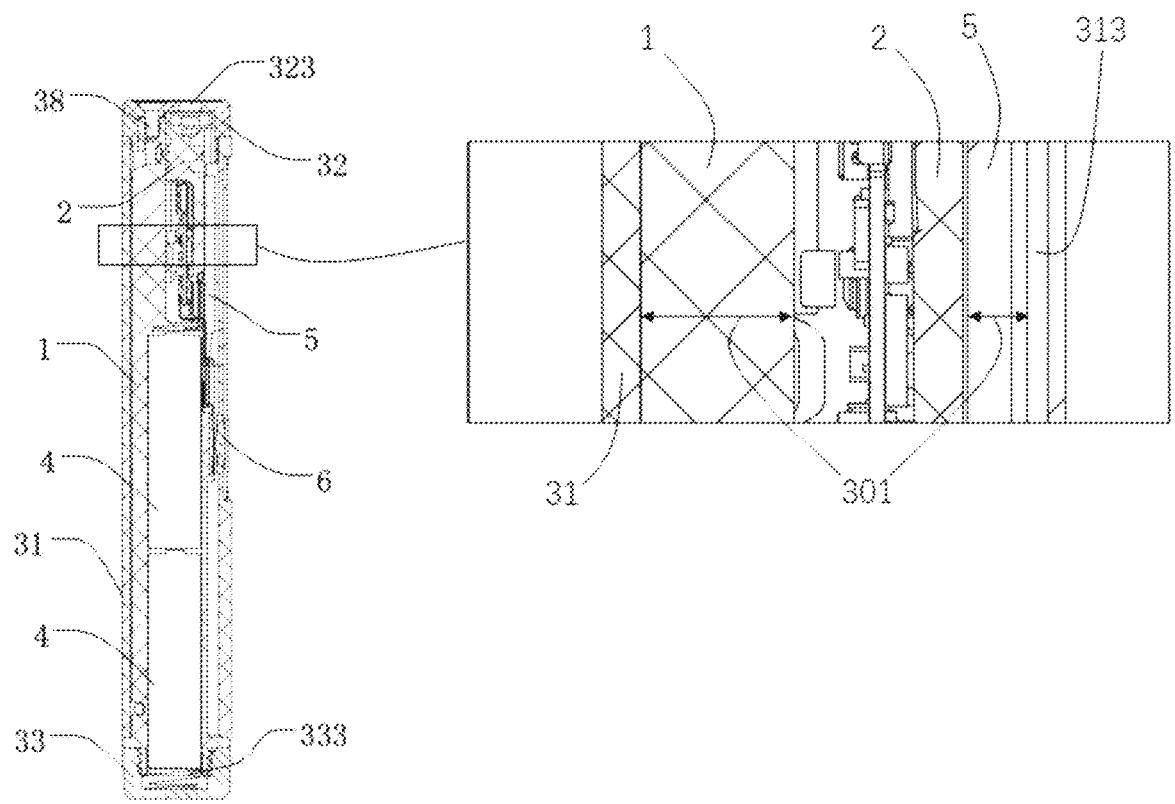
FIG. 4 is a cross-sectional structural diagram of Embodiment 1 of the present invention.

As shown in FIG. 4, the battery 4 is used to supply power to the display device 5. In this embodiment, two columnar batteries in series are preferably detachably mounted in the second mounting groove 12. The second mounting groove 12 has a shape adapted to that of the battery pack. In other embodiments, one or more columnar batteries or button batteries may also be selected.

As shown in FIGS. 5 to 6, the display device 5 is disposed in the third mounting groove 13 and connected to the measuring part 2 or the battery 4 through wires. The display device 5 is preferably a liquid crystal display (LCD) screen for displaying the distance reading measured by the core assembly 21. The shape of the third mounting groove 13 is adapted to that of the housing of the display device 5, and the LCD screen faces outwards.

The button switch 6 is disposed in the fourth mounting groove 14 and connected to the measuring part 2 or the battery 4 through wires. The shape of the fourth mounting groove 14 is adapted to that of the housing of the display device 5. When the button switch 6 is pressed, the battery 4 supplies power to the measurement part 2 and the display device 5. The display device 5 and the button switch 6 are arranged side by side, which is convenient for the user to control and read the indication. The measuring part 2, the display device 5, the battery 4 and the button switch 6 are all mounted on the holder 1, thereby forming the inner core 10. When the inner core 10 is being loaded into the cavity 302 of the housing 3 during assembly, the measuring part 2, the display device 5 and the battery 4 slide together with the holder 1.

Figure 7:
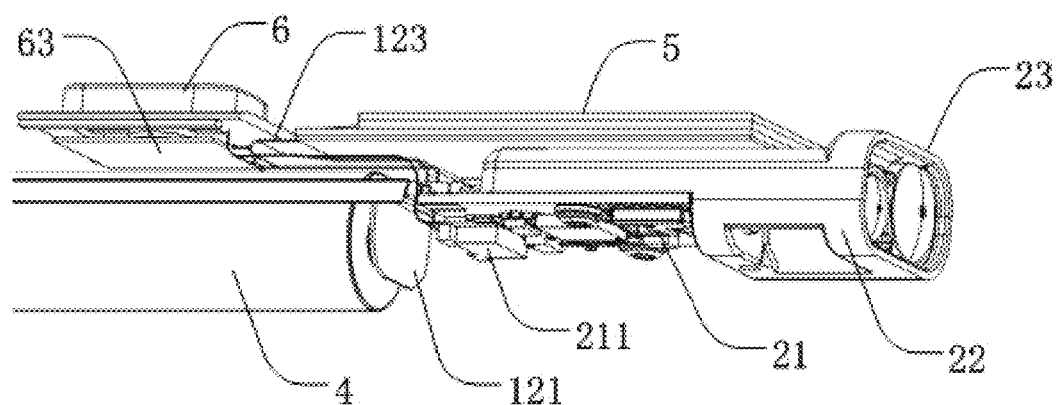
FIG. 7 is a structural diagram of a measuring part in Embodiment 1 of the present invention after removing the housing.
Figure 8:
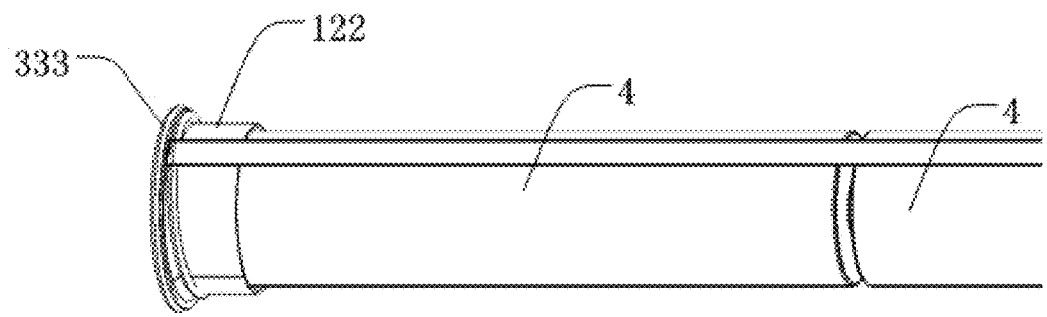
FIG. 8 is a structural diagram of a battery portion in Embodiment 1 of the present invention after removing the housing.

As shown in FIGS. 7 to 8, the front end of the second mounting groove 12 is provided with a metal contact 121 electrically connected to the positive pole of the columnar battery 4. A metal ring 122 is disposed at the rear end of the second mounting groove 12 and sleeved on the outside of the columnar battery 4 and electrically connected to the negative pole of the columnar battery 4. The core assembly 21 is provided with a power supply module 211. The metal contact 121 and the metal ring 122 are specially shaped wires directly or indirectly electrically connected to the power supply module 211 and the battery 4 for powering the core assembly 21. The power supply module 211 is electrically connected to the display device 5 through a bus 123 for supplying power to the LCD screen. The button switch 6 is electrically connected to the power supply module 211 and/or the battery 4 through wires to control on/off of the measuring part 2 and the display device 5.

As shown in FIGS. 6 to 7, when the button switch 6 is pressed in working state, the measuring part 2 and the display device 5 are simultaneously powered, and the laser generating device 22 emits a laser beam to irradiate an object to be measured. Light rays are reflected by the surface of the object and irradiated to the photoelectric conversion device 23 so that the distance between the reference point of the measuring part 2 and the object to be measured is calculated and displayed on the display device 5 so that the user can read the indication.

As shown in FIG. 4, the housing 3 includes a first casing 31, a second casing 32, and a third casing 33. The second casing 32 is detachably connected to the front end of the first casing 31, and the third casing 33 is detachably connected to the rear end of the first casing 31. The second casing 32 is disposed opposite to the first mounting groove 11 on which the measuring part 2 is mounted, and the third casing 33 is disposed opposite to the second mounting groove 12 on which the battery 4 is mounted.

Figure 9:
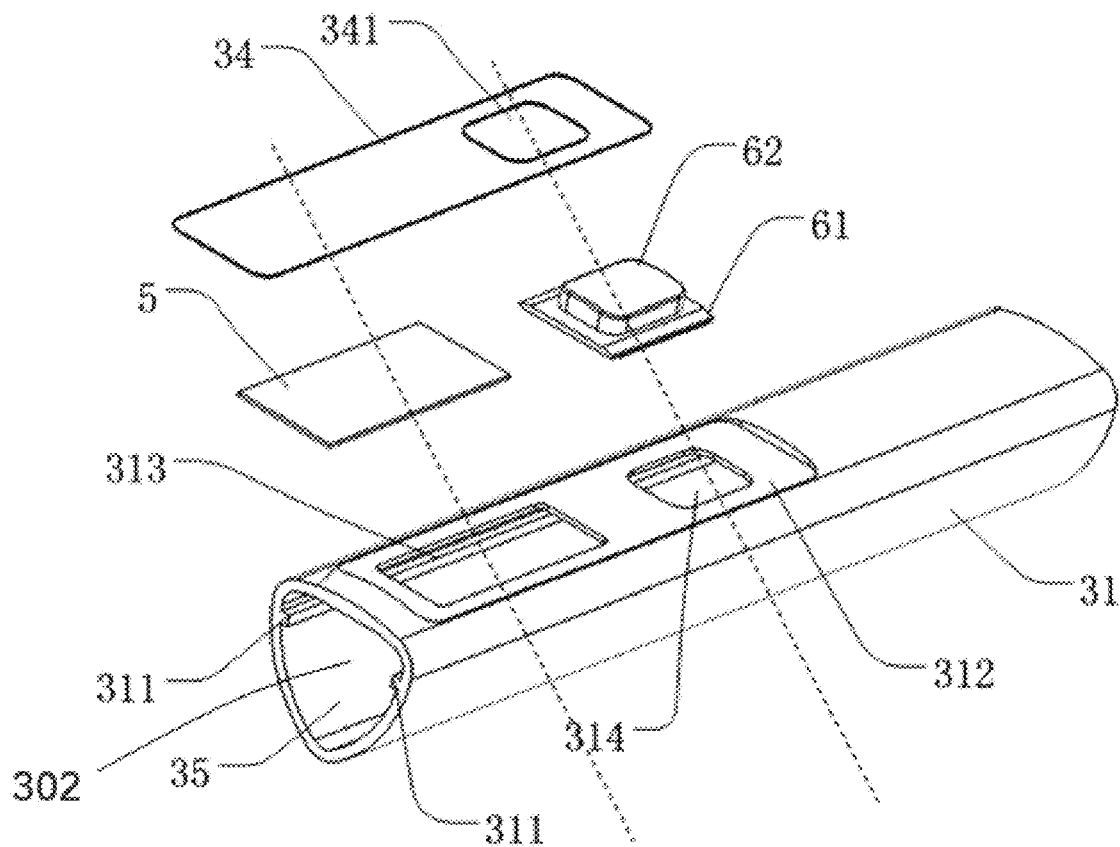
FIG. 9 is an exploded structural diagram of a first casing and a display device in Embodiment 1 of the present invention.

As shown in FIGS. 4 to 5 and 9, the first casing 31 is an integrally formed tubular structure, and has a cylindrical cavity therein, and the first casing 31 is sleeved outside the holder 1. Both ends of the first casing 31 are respectively provided with a first opening 35 and a second opening 36. The cross-sectional shapes and the sizes of the first opening 35 and the second opening 36 are all consistent with the cross-sectional shape and size of the inner wall of the first casing. The second casing 32 is detachably mounted to the first opening 35. A holder baffle 37 is disposed at the rear end of the holder 1 and has the same shape as or corresponds to the cross-section of the outer wall of the first casing 31. The front end of the holder 1 is inserted into the first casing 31 through the second opening 36, and the rear end thereof extends to the outside of the second opening 36 and is detachably connected to the third casing 33.

The holder 1 further comprises two oppositely disposed grooves 15 provided on the outer sidewall of the holder 1. The inner sidewall of the first casing 31 is provided with two ribs 311 protruding inwardly and oppositely. When the front end of the holder 1 is inserted into the first casing 31 via the second opening 36, the ribs 311 are slidably inserted into the groove 15, and the holder baffle 37 and the edge of the second opening 36 are oppositely disposed and abutted with each other. Meanwhile, the second casing 32 is fixed to the other end of the holder 1 through the first opening 35. The first casing 31 is sandwiched between the holder baffle 37 and the second casing 32, so that the first casing 31 and the holder 1 are relatively fixed. The holder 1 may be further provided on opposing sides thereof with fins 101 extending in a lengthwise direction of the holder 1. The fins 101 are flush with upper ends of the grooves 15. Preferably, upper side walls of the grooves 15 are provided by the fins 101. While the holder 1 is sliding into the first casing 31, the fins 101 are on top of the ribs 311. This can facilitate location of the holder 1 in the first casing 31 during assembly and disassembly of the holder 1.

After the measuring part 2 is mounted on the holder 1, during insertion of the holder 1 mounted with the measuring part 2 (inner core 10) into the first casing 31, only part of the holder 1, such as a bottom thereof, will come into contact with the first casing 31, and/or the fins 101 of the holder 1 will come into contact with the ribs 311. Such contact acts to maintain constant relative radial positions of the holder 1 and the first casing 31 during assembly and disassembly of the holder 1, thus enabling smooth sliding of the holder 1 into the first casing 31 or smooth removal thereof from the first casing 31. On the other hand, as the gap 301 is always present radially between the measuring part 2 and the first casing 31, the measuring part 2 will never come into contact the first casing 31. As a result, once adjusted, the accuracy of the measuring part 2 will not be affected during assembly, and it is unnecessary to again test and/or adjust the accuracy after the laser ranging apparatus is assembled. The holder baffle 37 functions to come into contact with the edge of the second opening 36 upon the holder 1 reaching the predetermined position in the first casing 31 and thereby stop further sliding of the holder 1. This enables rapid location of the holder 1 within the first casing 31, which helps to achieve higher assembly efficiency.

As shown in FIG. 9, the first casing 31 includes a first groove 312, a first through hole 313, and a second through hole 314. The first groove 312 is recessed on a surface of one side of the first casing 31; the position of the first groove 312 on the first casing 31 corresponds to the display device 5 and the button switch 6 on the holder 1. The first through hole 313 and the second through hole 314 respectively penetrate the bottom surface of the first groove 312, and the first through hole 313 is disposed opposite to the display device 5; a portion of the button switch 6 penetrates through the second through hole 314 so that the display device 5 and the button switch 6 can be exposed to the same side of the surface of the first casing 31 for user's operation. In other embodiments of the present invention, the display device 5 and the button switch 6 may be disposed outside the first casing 31. The first casing 31 only needs to have a through hole through which the connecting wire can pass.

This embodiment further includes a transparent cover 34 mounted in the first groove 312. The transparent cover 34 has a portion disposed opposite to the first through hole 313, and the transparent cover 34 protects the display device 5. The user can read the indication of the display device 5 through the transparent cover 34.

As shown in FIGS. 5 and 9, one end of the transparent cover 34 is provided with a cover through hole 341 disposed opposite to the second through hole 314. The button switch 6 includes an integrally formed switch base 61 and a button 62. The switch base 61 is disposed in the fourth mounting groove 14. The button 62 sequentially penetrates through the second through hole 314 and the cover through hole 341 to be exposed to the outside of the first casing 31, easy for users to press. A switch contact 63 is disposed under the switch base 61 and electrically connected to the power supply module 211 of the measuring part 2. When the button 62 is pressed, the battery 4 can be controlled to power on or off the measuring part 2 and the display device 5.

Figure 10:
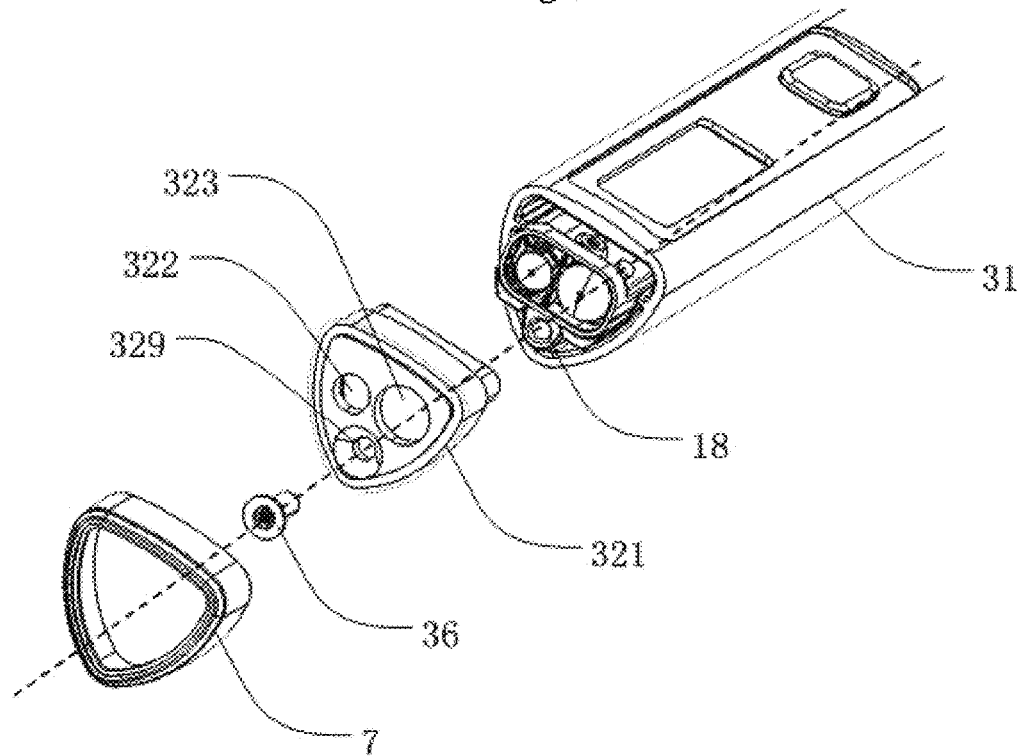
FIG. 10 is an exploded structural diagram of a second casing and the first casing in Embodiment 1 of the present invention.
Figure 11:
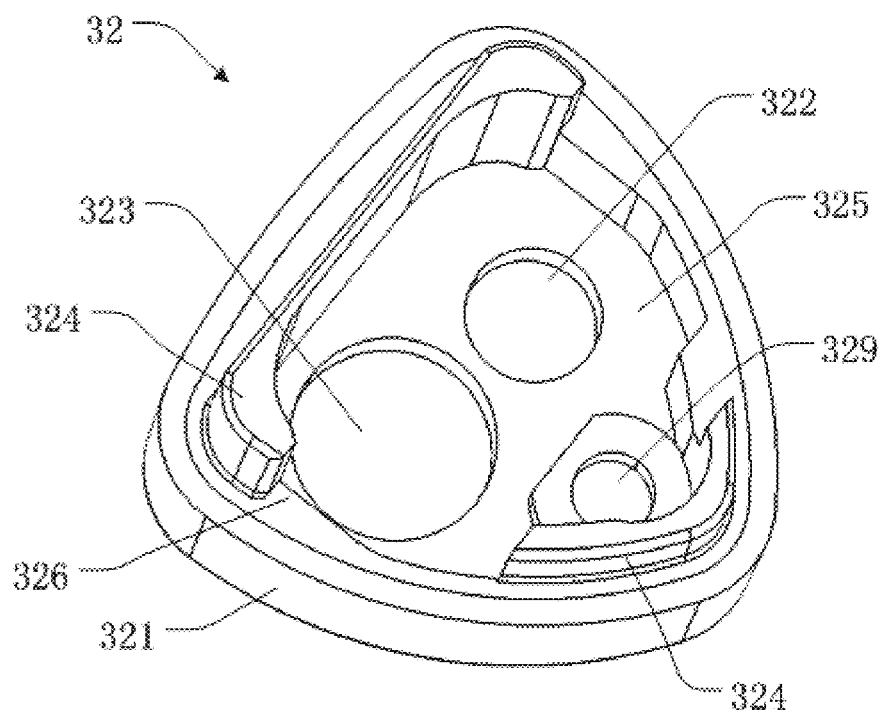
FIG. 11 is a structural diagram of the second casing in Embodiment 1 of the present invention.

As shown in FIGS. 10 to 11, in the present embodiment, the second casing 32 includes a second casing body 321, a third through hole 322, and a fourth through hole 323.

The laser generating device 22 of the measurement part 2 is provided with a first laser port 221 facing the first opening 25. The photoelectric conversion device 23 is provided with a second laser port 222 also facing the first opening 25. The third through hole 322 penetrates the second casing body 321 and is disposed opposite to the first laser port 221. The fourth through hole 323 penetrates the second casing body 321 and is disposed opposite to the second laser port 222. The third through hole 322 and the fourth through hole 323 are used to provide a passage for the laser beam to ensure that the laser beam emitted by the laser generating device 22 can irradiate the object to be measured and the reflected beam can irradiate the photoelectric conversion device 23.

The second casing 32 includes a first locking block 324 protruding from a surface of one side of the second casing body 321. The first locking block 324 is an annular locking block and is made of elastic material. The first locking block 324 is locked into the first opening 35 at the front end of the first casing 31. The cross-sectional shape of the outer wall of the first locking block 324 is adapted to the cross-section shape of the inner wall of the first casing 31. A second groove 325 is formed in a region surrounded by the first locking block and the second casing body 321. The laser generating device 22 and the photoelectric conversion device 23 at the front end of the measuring part 2 are inserted into the second groove 325.

The first locking block 324 is provided with two bayonets 326. The rib 3, the core assembly 21 and/or the front end of the holder 1 inside the first casing 31 can be inserted into the bayonet 326 so that the second casing 32 can be positioned in the first casing 31 without displacement or rotation.

The front end of the holder 1 is provided with a holder screw hole 18 disposed opposite to the second casing 32. The second casing 32 is provided with a fifth through hole 329 penetrating through the second casing body 321 and disposed opposite to the holder screw hole 18. The present embodiment further includes a screw 38 threadedly connected to the holder screw hole 18 through the fifth through hole 329, and the screw 38 enables the second casing 32 to be fixed to the first casing 31 conveniently and quickly.

Figure 12:
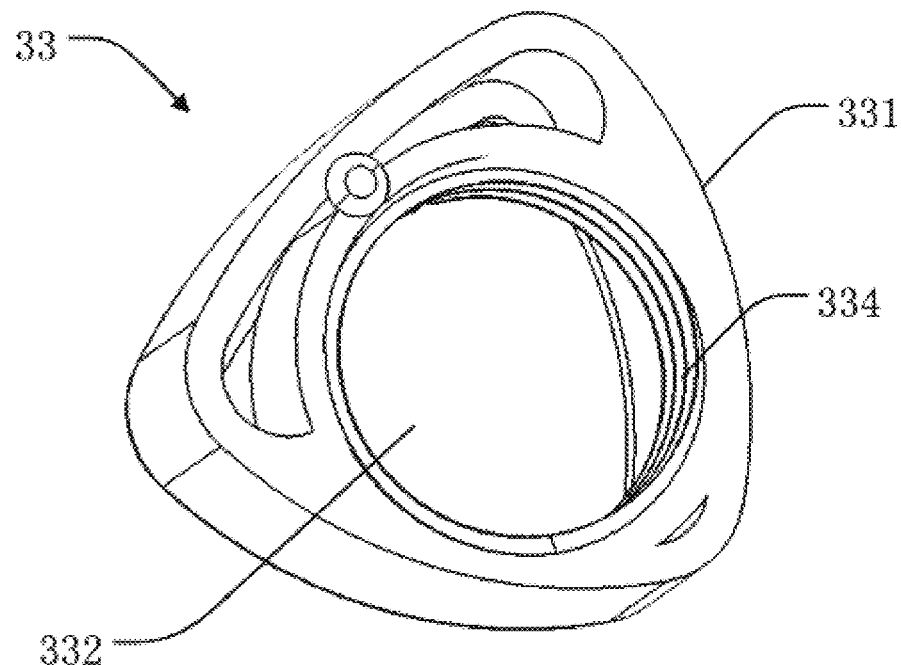
FIG. 12 is a structural diagram of a third casing in Embodiment 1 of the present invention.
Figure 13:
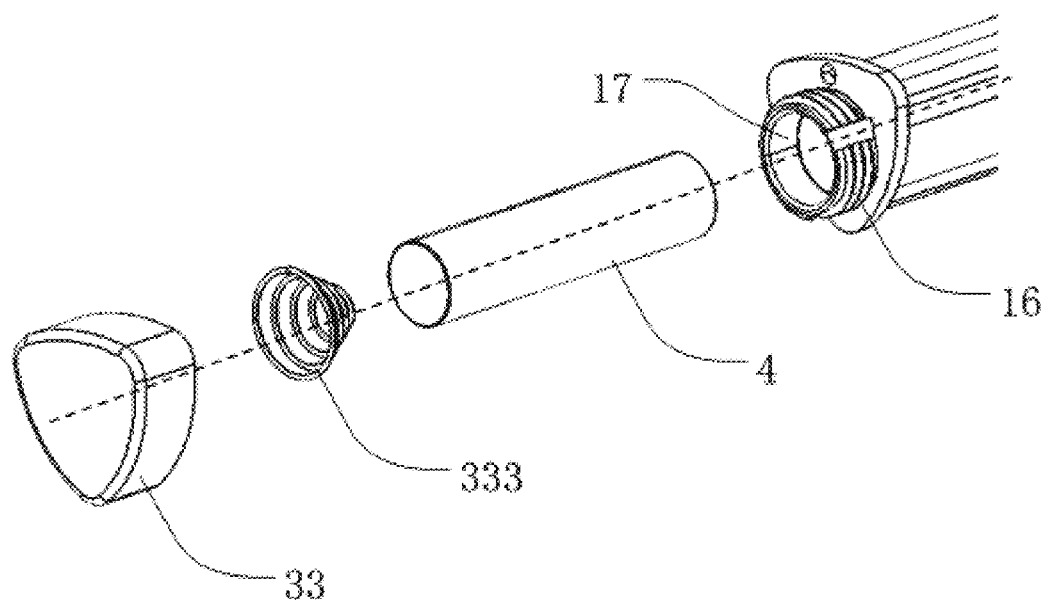
FIG. 13 is an exploded structural diagram of the third casing and the first casing in Embodiment 1 of the present invention.

As shown in FIGS. 12 to 13, the third casing 33 includes a third casing body 331, a third groove 332, and an elastic member 333. The third groove 332 is disposed on one side of the third casing body 331 with a notch direction facing the first casing 31. The sizes of the inner diameter and outer diameter of the third casing 33 are the same as those of the first casing 31. The elastic member 333 is disposed on the bottom of the third groove 332. The elastic member 333 is a coil spring having different diameters at both ends, and is connected to the bottom of the third groove 332.

The third casing 33 is detachably connected to the holder 1. Preferably, the rear end of the holder 1 is provided with a protruding male connector 16 near the holder baffle 37. A female connector 334 is disposed at the notch of the third groove 332. The male connector 16 is threaded to the female connector 334. The male connector 16 is provided with a connector cavity 17 communicating with the second mounting groove 12. The battery 4 is inserted into the second mounting groove 12 by the connector cavity 17.

After the third casing 33 is connected to the holder 1, a smaller diameter end of the elastic member 333 is connected to the battery 4 in the second mounting groove 12 through the connector cavity 17, and the larger diameter end is fixed to the bottom of the third groove 332. The elastic member 333 is used to support the negative pole of the battery 4 such that the positive pole of the battery 4 is in close contact with the metal contact plate 121 to ensure good contact between the two ends of the battery 4. Since the metal ring 122 is electrically connected to the elastic member 333, the metal ring 122 is also connected to the negative pole of the battery 4.

In this embodiment, the holder 1 is elongated, the shape of the housing 3 is a straight cylinder, and the shape and size of two or more cross-sections of the housing 3 are the same. The cross-section is perpendicular to the central axis of the straight cylinder housing. The cross-section of the housing 3 is preferably a rounded triangle. In other embodiments, the cross-section of the housing 3 can also be a circle, an oval, a rounded rectangle or a rounded polygon. The round or rounded structure design makes the housing 3 convenient for the user to hold and enhance the hand feeling to prevent from slipping off from the user's hand. The material of the housing 3 is aluminum alloy, plastic, nylon material or carbon fiber material, which has the advantages of light weight, firmness and toughness, and low cost.

In this embodiment, the measuring part 2 and the display device 5 form a measurement display part, which is an important functional component. In order to ensure the laser ranging function and display effect, the measurement display part needs to occupy a larger space. The measuring part 2 employs a smaller size core assembly, preferably a small core assembly with a length of 39 mm, a width of 16 mm, a height of 10 mm. In the present invention, the cross-sectional height of the measurement display part is in a range of 10-12 mm; the cross-sectional width of the measurement display part is in a range of 15-17 mm; and the length of the measurement display part is in a range of 39-45 mm. The measurement display part can ensure the laser ranging function and the display effect within the above ranges of sizes, and ensure robust product functions.

In order to ensure product quality and thus ensure that it has a certain degree of firmness and anti-shock performance, the housing 3 need to have a certain thickness, and the housing 3 and the holder 1 must also maintain a certain gap therebetween.

The cross-sectional height of the housing 3 is in a range of 14-22 mm; and the cross-sectional width of the housing 3 is in a range of 18-25 mm. When the cross section of the housing 3 is circular, the diameter of the cross section of the housing 3 is in a range of 18-28 mm. When the cross section of the housing 3 is an oval, a rounded triangle, a rounded rectangle or a rounded polygon, the diameter of the inscribed circle of cross section of the housing 3 is in the range of 18-20 mm and the diameter of the circumscribed circle of the cross section of the housing 3 is in the range of 20-28 mm. When the battery is a button battery, the length of the housing 3 is in a range of 65-70 mm. When the battery 4 is a columnar battery, the length of the housing 3 is in a range of 95-140 mm. When the battery 4 is one columnar battery, the length of the housing 3 is 95 mm. When the battery 4 is two columnar batteries, the length of the housing 3 is 140 mm. When the housing 3 has a size within the above range, it can be ensured that the product has good anti-shock performance and hand feeling, and is easy to disassemble and assemble.

The ratio of the cross-sectional width of the measurement display part to the cross-sectional width of the housing 3 is in a range of 0.6-0.8; the ratio of the cross-sectional height of the measurement display part to the cross-sectional height of the housing 3 is in a range of 0.6-0.8; and the ratio of the cross-sectional area of the measurement display part to the cross-sectional area of the housing 3 is in a range of 0.67-0.8.

The measuring display part and the housing 3 can ensure the laser ranging function and the display effect within the above-mentioned size range, and ensure robust product functions. As a core component, the core assembly takes up less space, and the size of the housing cooperating therewith is also relatively small, so that the product as a whole can be as small as possible to reduce occupied space, making the product of the present invention easy to carry.

The laser ranging apparatus according to the present invention may further include a sheath 7 which may cover the outer surface of the housing 3 partially or entirely. Specifically, the sheath 7 may cover the outer surface of the first casing 31 partially or entirely; and/or cover the outer surface of the second casing 32 partially or entirely; and/or cover the outer surface of the third casing 33 partially or entirely. The sheath 7 is generally made of elastic material and can enhance the hand feeling, which is easy for users to hold and can prevent the laser ranging apparatus from slipping off. Even if a slippage occurs, since the housing 3 of the laser ranging apparatus is covered with the sheath 7, a certain buffering effect can also be provided to effectively prevent the product from being damaged. In this embodiment, the sheath is preferably provided outside the second casing 32, see FIG. 10.

One technical effect of this embodiment is that, during assembly, the measuring part 2, the display device 5 and the like are first fixedly mounted in the corresponding mounting grooves of the holder 1, and the holder 1 with the measuring part 2 thereon is slid into the first casing 31 with the aid of the ribs 311 and the grooves 15. After that, the second casing 32 is assembled to one end of the first casing 31 through the first locking block 324 and a second locking block 328, and the third casing 33 is threadedly coupled to the holder 1 at the other end of the first casing 31. This assembly process involves easy operation and can be accomplished rapidly. Disassembly is a reverse process involving removing first the second casing 32 and the third casing 33 from opposing ends of the first casing 31, then the battery 4 and subsequently the holder 1 from the first casing. In the disassembly and assembly processes, the measuring part 2 and the holder 1 are inserted into the first casing 31 and removed therefrom as a whole, and it is not necessary for a worker or maintenance technician to touch the measuring part 2 because it is always secured to the holder 1. In addition, because of the presence of the gap 301 between the measuring part 2 and the first casing 31, the measuring part 2 will not come into collision or contact with the first casing 31 throughout the assembly or disassembly process. Therefore, during assembly or disassembly of the laser ranging apparatus, it is not necessary to again adjust the accuracy of the measuring part 2 while still effectively ensuring that the measuring part 2 always maintains the same measuring accuracy since the accuracy adjustment at the time of delivery from the factory.

Another technical effect of this embodiment is that the main working components of the present embodiment, such as the measuring part 2, the battery 4, the display device 5 and the button switch 6, etc., are all fixedly mounted in the holder 1, and the housing 3 is only required to be support and fix the holder 1, no other parts are required to be supported and fixed by the housing 3. Therefore, compared with the prior art, the internal structure of the housing 3 is simplified. The housing 3 can be composed by several components with simple shapes. The overall manufacturing process of the housing 3 can also be simplified, which can reduce production costs, improve production efficiency, and increase productivity.

Another technical effect of this embodiment lies in that the overall size of the laser ranging apparatus according to the embodiment is small, the structure is compact, the portablility is high, and the anti-shock performance and hand feeling are good.

Embodiment 2

Figure 14:
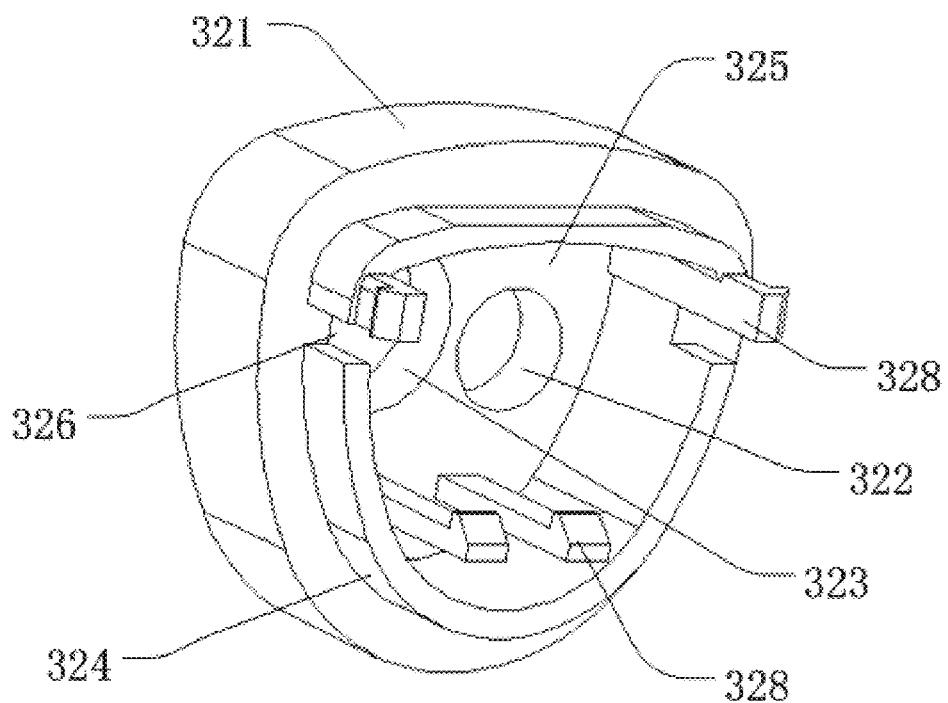
FIG. 14 is a structural diagram of the second casing in Embodiment 2 of the present invention.
Figure 15:
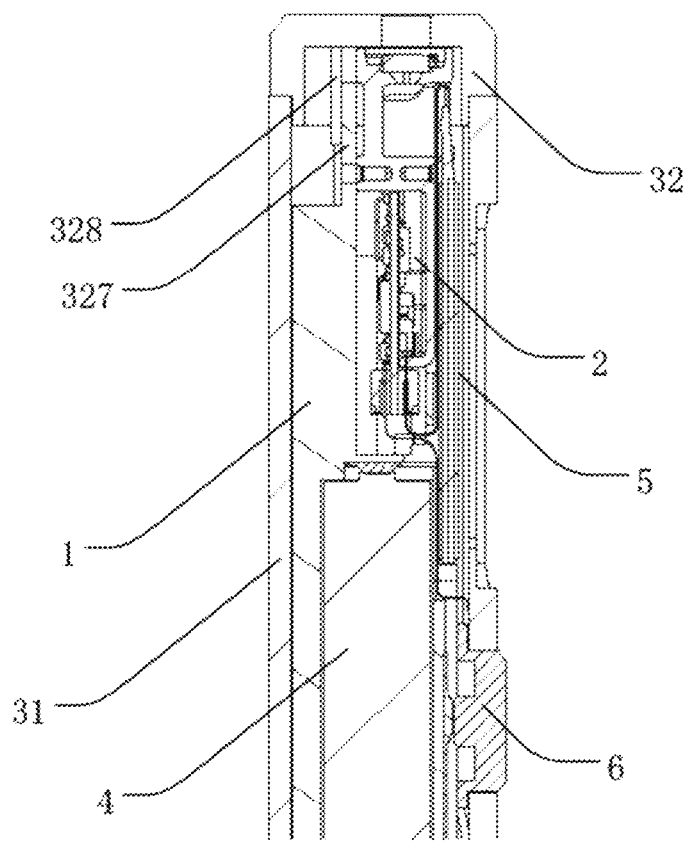
FIG. 15 is a cross-sectional view of a partial structure of Embodiment 2 of the present invention.

As shown in FIGS. 14 to 15, the technical solution of this embodiment includes most of the technical features of Embodiment 1, except that in Embodiment 2, the second casing 32 does not include a screw structure but includes a first locking bock 324 and a second locking block 328.

The second casing 32 includes a first locking block 324 protruding from a surface of one side of the second casing body 321 and being locked inside the first opening 35 at the front end of the first casing 31. The shape of the cross-section of the outer wall of the first locking block 31 is adapted to that of the cross-section of the inner wall of the first casing 31. The first locking block 324 is made of elastic material, the second groove 325 is formed in a region surrounded by the first locking block and the second casing body 321, and the laser generating device 22 and the photoelectric conversion device 23 at the front end of the measuring part 2 are inserted into the second groove 325.

The first locking block 324 is provided with two bayonets 326. The front end of the holder 1 inside the first casing 31 can be inserted into the bayonet 326 so that the second casing 32 can be positioned on the first casing 31 without displacement or rotation.

One or more locking grooves 327 are provided on the inner sidewall of the front end of the first casing 31 or on the front end of the holder 1. One or more second locking blocks 328 are provided and protruded from a surface of one side of the second casing body 321. The second locking blocks 328 are respectively locked into each groove 327. The first locking block 324 and the second locking block 328 cooperate with each other to detachably connect the second casing to the first opening 35 of the first casing 31.

Other technical features of this embodiment are the same as those in Embodiment 1, and details are not described herein again.

The technical effect of this embodiment is to provide another new housing connection manner so that the second casing 32 and the first casing 31 can be easily and quickly removed or assembled without tools, and the structure of the second casing 32 can be further simplified, processing difficulty can be further reduced, and production process can be simplified.

Embodiment 3

Figure 16:
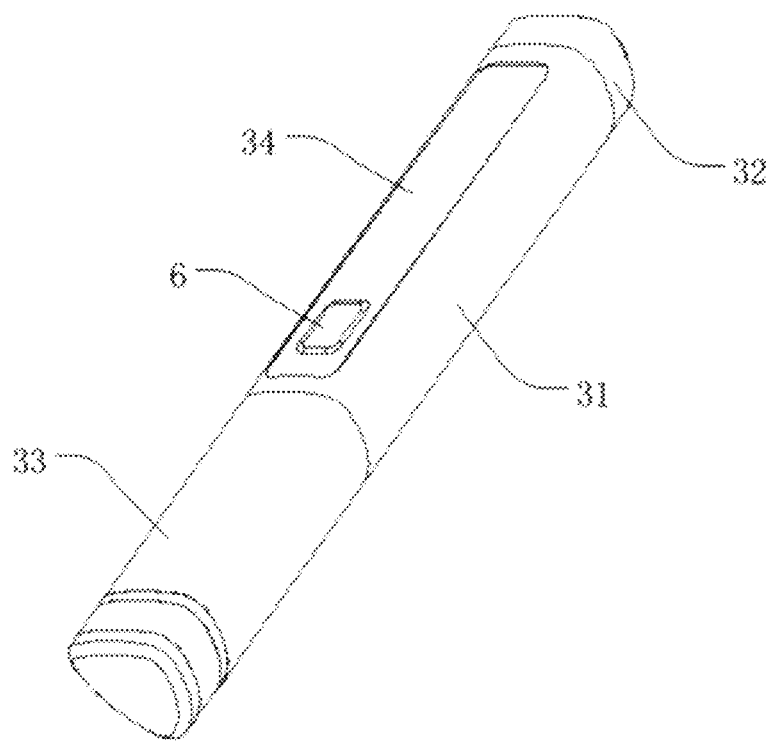
FIG. 16 is a schematic diagram of an overall structure of Embodiment 3 of the present invention.
Figure 17:
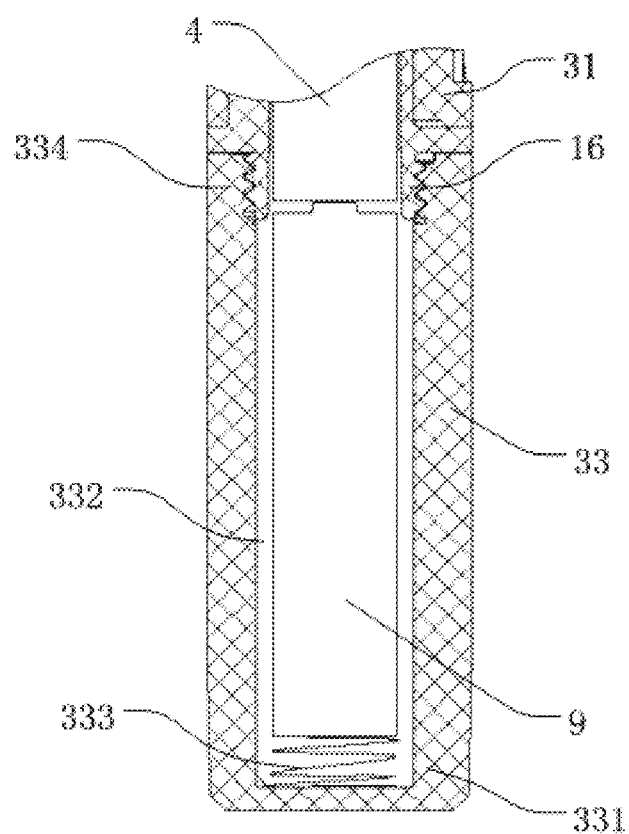
FIG. 17 is a schematic cross-sectional view of a partial structure in Embodiment 3 of the present invention.
Figure 18:
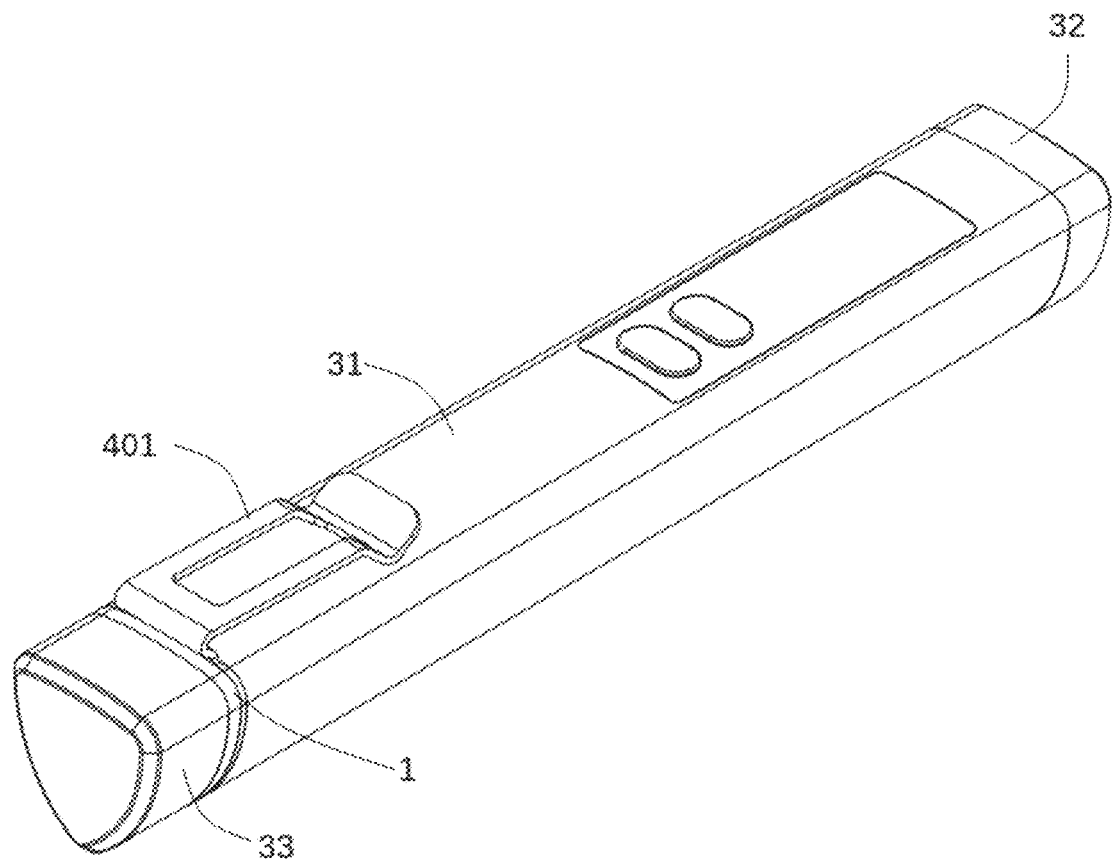
FIG. 18 is a schematic overview of Embodiment 4 of the present invention, showing a clamping member.
Figure 19:
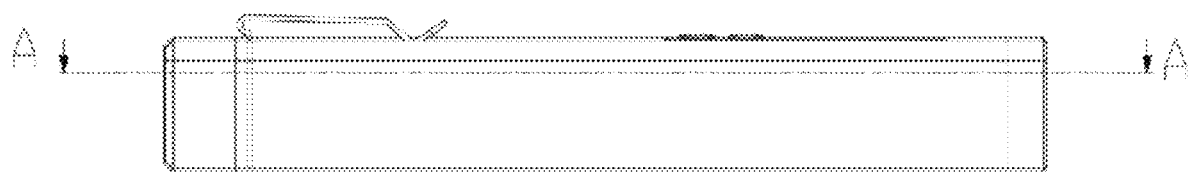
FIG. 19 is a front view of Embodiment 4 of the present invention.
Figure 20:
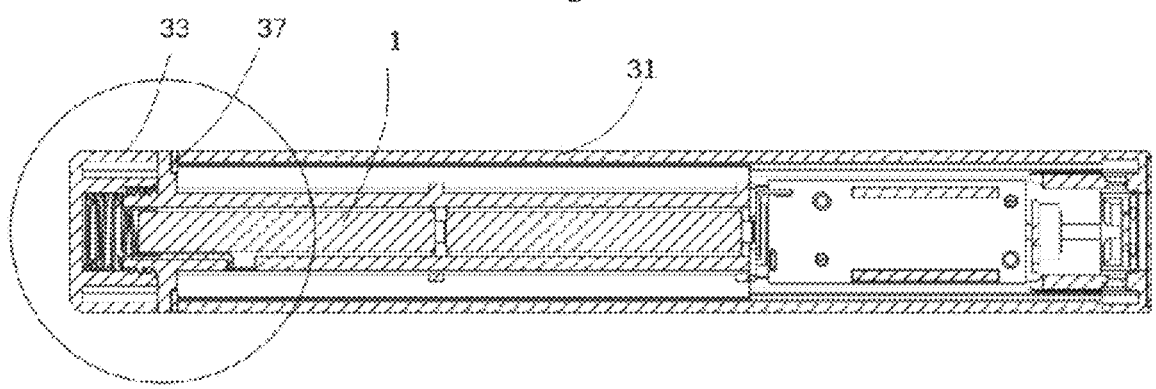
FIG. 20 is a schematic cross-sectional view of Embodiment 4 of the present invention taken along A-A.
Figure 21:
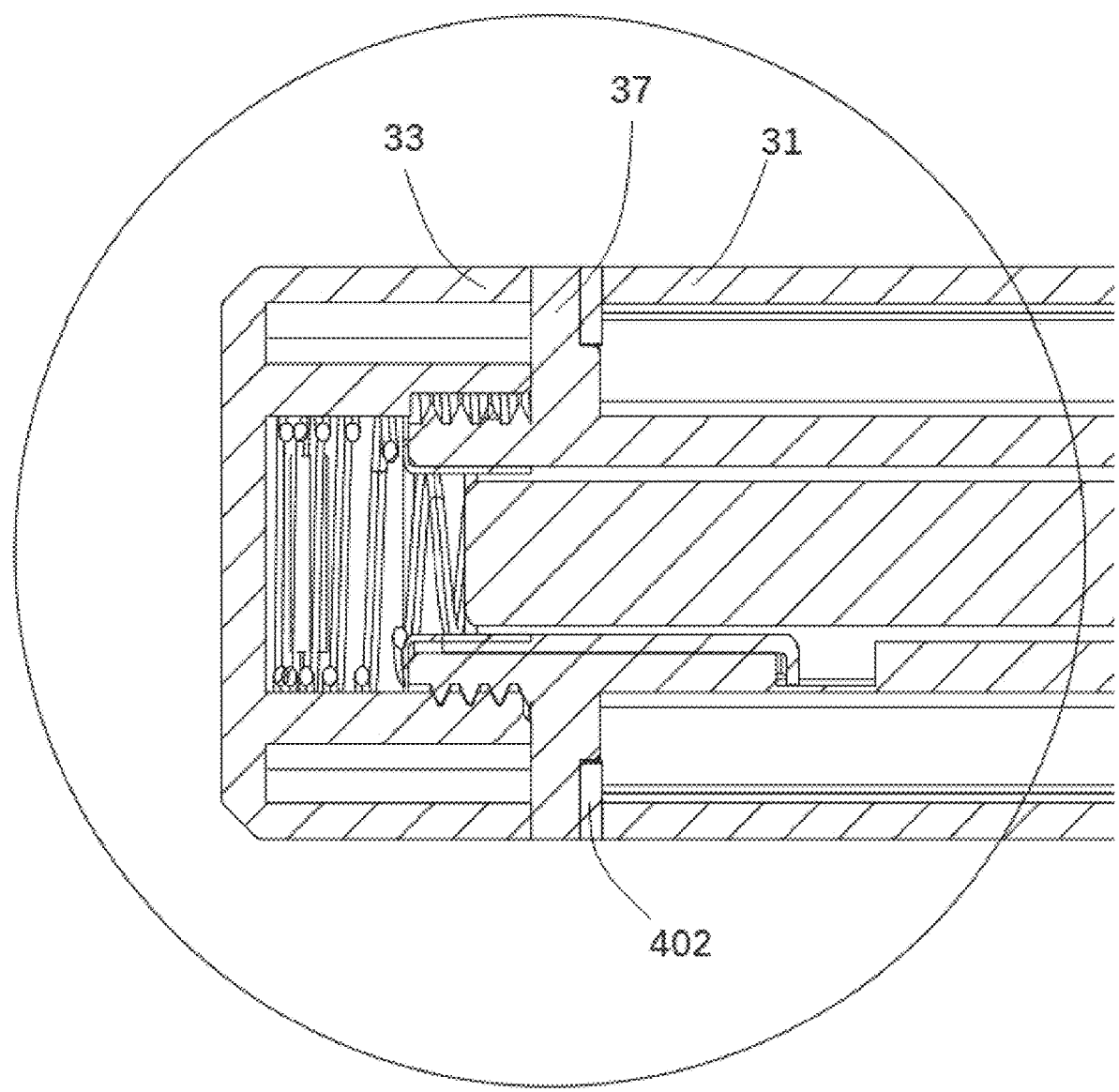
FIG. 21 is an enlarged, schematic partial view of Embodiment 4 of the present invention, in which the clamping member is disposed between a holder baffle and a first casing.

As shown in FIGS. 16 to 17, the technical solution of this embodiment includes most of the technical features of Embodiment 1. The difference therebetween lies in that, in embodiment 4, the depth of the third groove 332 is larger, and thus one or more batteries can be additionally added and connected in series with the battery 4 in the second mounting groove 12.

The third casing 33 includes a third casing body 331, a third groove 332, and an elastic member 333. The third groove 331 is disposed on one side of the third casing body 331 with a notch direction facing the first casing 31. The sizes of the inner diameter and the outer diameter of the third groove 331 are the same as those of the first casing 31.

In this embodiment, the battery 4 in the second mounting groove 12 may be a single battery, or may be two or more batteries connected in series with each other. Further, the present embodiment further includes a second battery 8 detachably installed in the third groove 332. One end of the second battery 8 (positive pole) is connected in series to the battery 4 in the holder 1, and the other end (negative pole) is connected to the elastic member 333. The second battery 8 may be a single battery, or a battery pack having two or more batteries connected in series with each other. In this embodiment, the second battery 8 is preferably a columnar battery. In other embodiments, the second battery 8 may also be one or more button batteries.

The elastic member 333 is disposed at the bottom of the third groove 332. The elastic member 333 is a coil spring having different diameters at both ends. One end with a larger diameter is connected to the bottom of the third groove 332, while another end with a smaller diameter is connected to the second battery 8. In other embodiments, the elastic member 333 may also be a coil spring having the same diameter at both ends.

The rear end of the holder 1 is provided with a protruding male connector 16. A female connector 334 is disposed at the notch of the third groove 332. The male connector 16 is detachably connected to the female connector 334. In this embodiment, a set of threads are provided on the outer sidewall of the male connector 16, and also a set of threads are provided on the inner sidewall of the female connector 334. The two sets of threads have corresponding shapes and sizes, and the male connector 16 can be threaded into the female connector 334. In other embodiments, the male connector 16 and the female connector 334 may be connected to one another using other removable structures.

The male connector 16 is in-built with a connector cavity 17, one end of the male connector 16 is connected to the second mounting groove 12, and the other end of the male connector 16 is connected to the third groove 332. The second mounting groove 12, the connector cavity 17 and the third groove 332 are located on the same straight line and communicate with each other, so that the three become a complete battery mounting groove. A plurality of batteries can be connected from end to end in series with each other. After the third casing 33 is connected to the first casing 31, the second battery 8 is connected to the battery 4 in the second mounting groove 12 through the connector cavity 17.

After the third casing 33 is connected to the first casing 31, the elastic member 333 is used to support the negative pole of the second battery 8 so that the positive pole of the battery 4 is in close contact with the metal contact 121, and the negative pole of the second battery 8 and the elastic member 333 are closely connected to ensure that both ends of the entire battery pack are in good contact. Since the metal ring 122 is electrically connected to the elastic member 333, the metal ring 122 is also connected to the negative pole of the second battery 8.

The technical effect of the present embodiment is to provide a solution for disposing a battery in the third casing 33 so as to reduce the length of the first casing 31, reduce the processing difficulty and simplify the manufacturing process. At the same time, in the present embodiment, a plurality of batteries can be simultaneously arranged, which can be applied to a high-power laser ranging apparatus and enhance the hand feeling, which is suitable for more situations.

Embodiment 4

In Embodiments 1 to 3, the first casing 31 is hollow, and the holder 1 is provided thereon with a holder baffle 37. In the course of the holder 1 being slid into the first casing 31, the holder baffle 37 comes into abutment against an edge of the second opening 36 of the first casing 31, and the other end of the holder 1 (which is located around the first opening 35 of the first casing 31) is secured with a fastener or stopper (e.g., by passing part of the second casing 32 through the first opening 35 and coupling the second casing 32 to the holder 1 using the fastener, or by snapping the first locking block 324 on the second casing 32 into the first opening 35 of the first casing 31), thereby accomplishing axial fixation of the holder 1.

Figure 22:
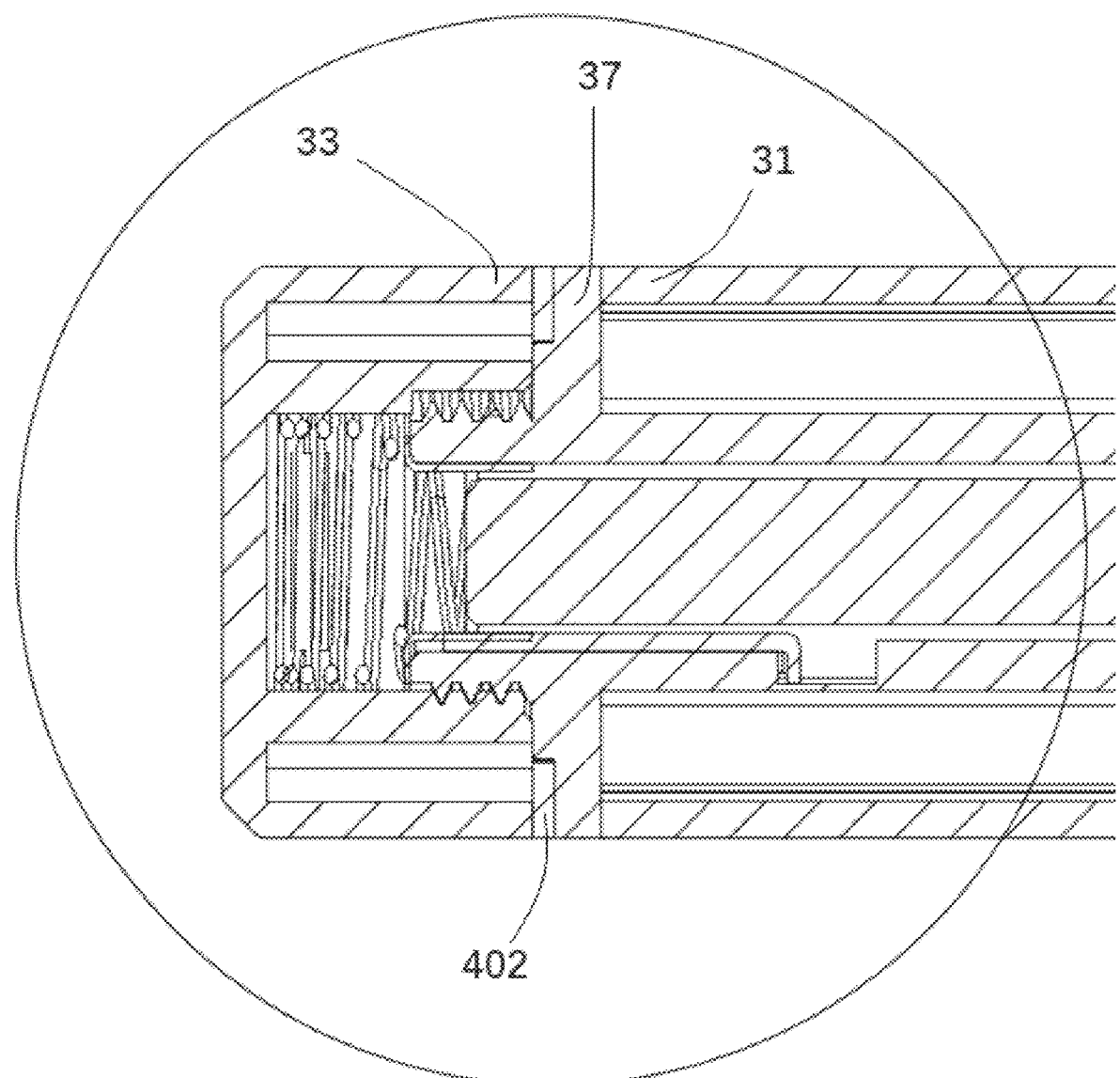
FIG. 22 is an enlarged schematic view of part of Embodiment 4 of the present invention, in which the clamping member is disposed between a third casing and the holder baffle.
Figure 23:
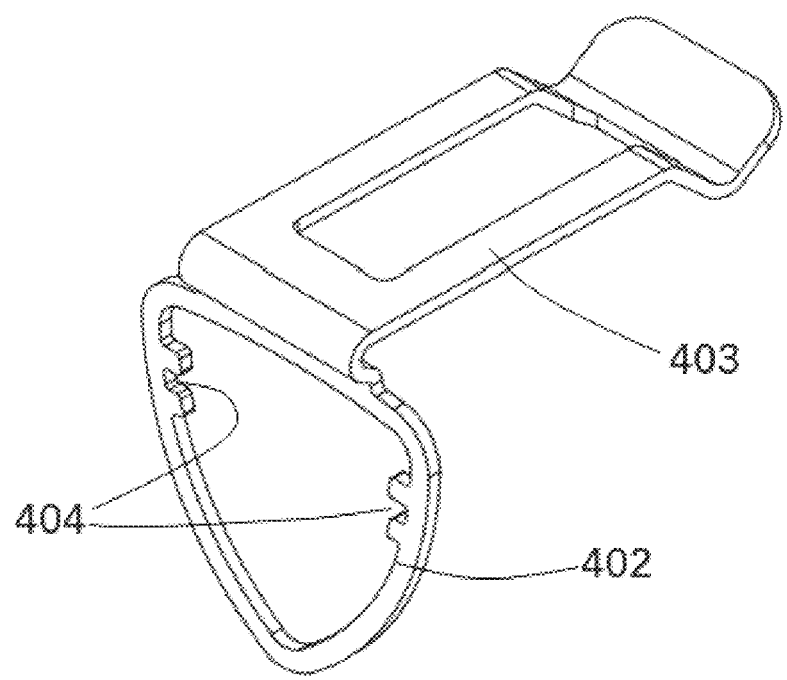
FIG. 23 is a schematic illustration of the clamping member in Embodiment 4 of the present invention.

As shown in FIGS. 18 to 24, this embodiment is based on Embodiments 1 to 3 and adds a clamping member 401. As shown in FIG. 23, the clamping member 401 includes a stopper portion 402 and a clamping portion 403. The stopper portion 402 is disposed between the holder baffle 37 and the first casing 31. The stopper portion 402 abuts against one end of the first casing 31, and the holder baffle 37 abuts against the stopper portion 402, thus securing the clamping member 401. The other end of the holder 1 is secured in the same manner as in Embodiments 1 to 3, thereby accomplishing axial fixation of the holder 1. The clamping portion 403 is disposed on a surface of the first casing 31 so as to be joined to the stopper portion 402 at one end and movable at the other end. By means of the clamping member 401, the laser ranging apparatus can be clamped on a wall sheet of a tool bag or pocket, making it easy to carry without falling off. The clamping member may be implemented as a pen clip, a clamp fastener or the like.

Figure 24:
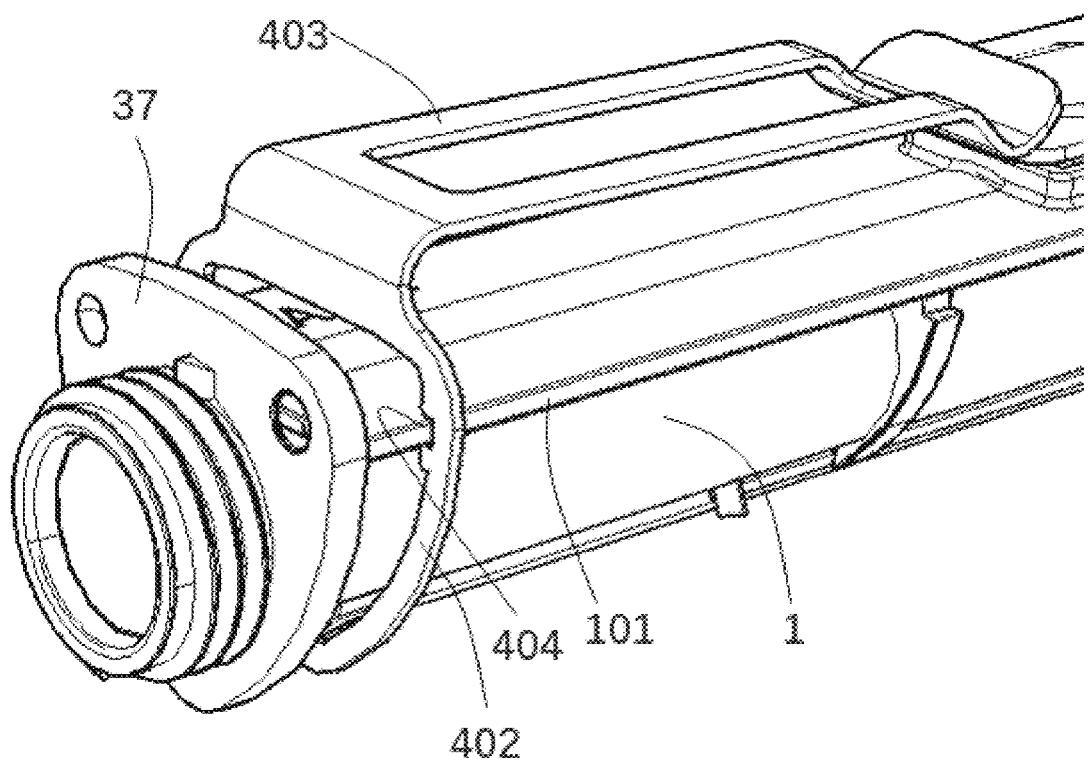
FIG. 24 is schematic diagram showing mating of the clamping member with a holder in Embodiment 4 of the present invention.

In some embodiments, as shown in FIG. 23, the clamping member 401 is an independent member, and the stopper portion 402 is shaped like a ring. The cross-sectional shape of the stopper portion 402 matches a cross-sectional shape of the holder 1, and the stopper portion 402 is disposed over the holder 1. Preferably, grooves 404 are defined on an inner side of the ring of the stopper portion 402. As shown in FIG. 24, the grooves 404 cooperate with the lateral fins 101 of the holder 1. The stopper portion 404 is disposed over the holder 1 so that the fins 101 run through the grooves 404. As such, the stopper portion 402 is circumferentially restrained relative to the holder 1. This enables the stopper portion 402 to be accurately disposed over the holder 1, resulting in improved assembly efficiency.

In some embodiments, as shown in FIG. 22, the stopper portion 402 is disposed between the third casing 33 and the holder 1. The holder 1 abuts against one end of the first casing 31 while being partially exposed from the first casing 31. The stopper portion 402 is disposed over the exposed part of the holder 1, and the third casing 33 is then coupled to the holder 1. In this way, the abutment of the third casing 31 against the stopper portion 402 secures the stopper portion 402 between the third casing 33 and the holder baffle 37 of the holder 1.

In some embodiments, the clamping member 401 may be integrally formed with the first casing 31. That is, the clamping portion 403 directly extends from the surface of the first casing 31.

Embodiment 5

FIGS. 25 to 30 show a laser ranging apparatus according to this embodiment.

Figure 25:
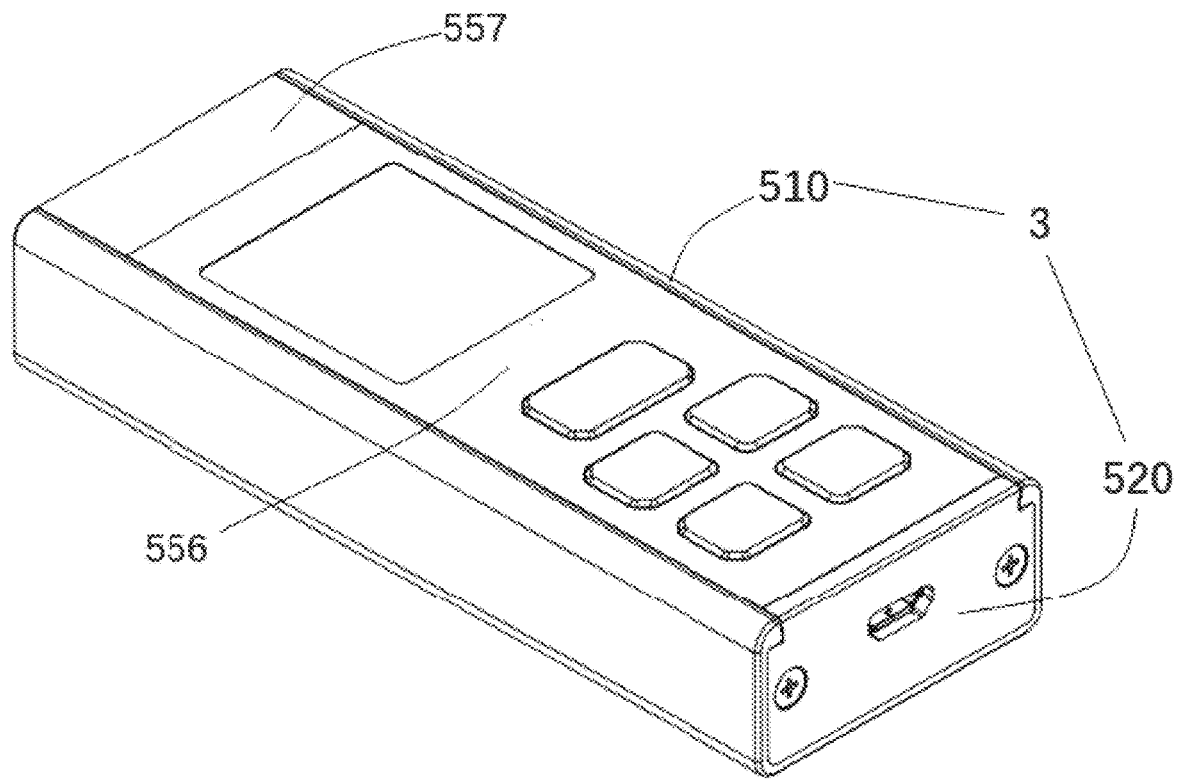
FIG. 25 is a schematic illustration of Embodiment 5 of the present invention.

In Embodiments 1 to 3, the housing 3 has a substantially triangular cross-section. As shown in FIG. 25, in the laser ranging apparatus provided in this embodiment, the housing 3 has a substantially rectangular cross-section. In addition, a displaceable battery is used in Embodiments 1 to 3 as a power supply. In contrast, in this embodiment, a rechargeable battery is used instead. It is to be understood that, in Embodiments 1 to 3, the battery may be replaced with the rechargeable battery in this embodiment. The laser ranging apparatus in this embodiment will be described in detail below with reference to the accompanying drawings.

Figure 26:
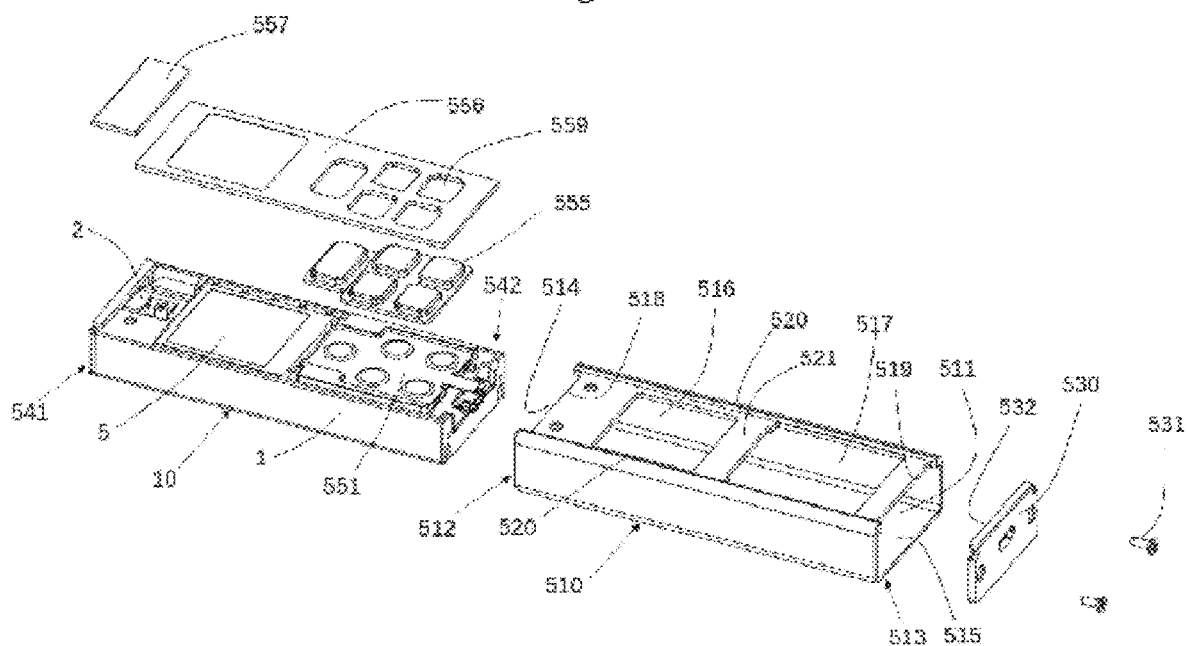
FIG. 26 is an exploded schematic view of part of Embodiment 5 of the present invention.

As shown in FIGS. 25 and 26, the laser ranging apparatus includes a housing 3 and an inner core 10. The inner core 10 includes a holder 1 and a measuring part 22 mounted to the holder 1. The inner core 10 is mounted, as a whole, in a cavity 511 of the housing 3. The measuring part 2 is mounted to the holder 1 by a fixed connection, thereby forming the inner core 10. The housing 3 is disposed over the inner core 10 so as to surround both the holder 1 and the measuring part 2, with a gap 301 being always kept between the housing 3 and the measuring part 2 (see FIG. 29). In this embodiment, the measuring part 2 is disposed at a front end 541 of the holder 1. During insertion or removal of the inner core 10 into or from the housing 3, the holder 1 and the measuring part 2, i.e., the inner core 10, are always treated as a whole, with the gap 301 being always kept between the housing 3 and the measuring part 2, which prevents the two from coming into contact with each other. In this way, once adjusted at the time of delivery from the factory, the measuring part 2 will neither be touched by an operator during assembly, nor will come into collision or contact with the housing 3, thereby ensuring ranging accuracy of the measuring part 2.

As shown in FIG. 26, the housing 3 includes a first casing 510, which is elongate in shape and defines a constant-diameter cavity 511 in which the holder 1 and the measuring part 2 are accommodated. The first casing 510 has a substantially rectangular cross-section and may be made of a metal material. For example, a predetermined length may be cut off from a metal profiled and then simply processed into the first casing 510.

The first casing 510 has a first end 512 and a second end 513, which oppose each other in a lengthwise direction thereof. Openings may be respectively provided at the first end 512 and the second end 513, which are referred to as a first opening 514 and a second opening 515 hereinafter. The holder 1 is inserted into the first casing 510 through the first opening 514. A second casing 530 is provided at the second opening 515 so as to cover and close the second opening 515. The second casing 530 is then connected to the holder 1 with a fastener 531, thereby securing the holder 1. It is to be understood that the first casing 510 may also be provided with a single opening at the first end 512 while the opposing second end 513 is closed. In this case, the second casing 530 may be omitted.

The first casing 510 is provided, in a side wall thereof, with a first housing through hole 516 and a second housing through hole 517. Preferably, the side wall is provided with lips 520 running along two edges thereof extending in the lengthwise direction. The lips delimits therebetween a depression 521, and the first housing through hole 516 and the second housing through hole 517 are formed through a bottom surface of the depression 521.

The first casing 510 is provided in one side wall thereof with notches at the openings. Specifically, a first notch 518 is provided at the first opening 514, and a second notch 519 is provided at the second opening 515. For ease of fabrication, the notches and the housing through holes are provided in the same side wall. That is, the first notch 518 and the second notch 519 are provided in the bottom surface of the depression 521. The first notch 518, the second notch 519, the first housing through hole 516 and the second housing through hole 530 can be easily formed by punching the side wall.

The second casing 530 is in the form of a cover, which has a contour corresponding to a cross-section of the constant-diameter cavity 511 and a second protrusion 532 extending outwardly from the contour. A shape of the second protrusion 532 matches a shape of the second notch 519 at the second opening 515. When covering and closing the second opening 515, the second casing 530 fits in the constant-diameter cavity 511, with its outer surface being flush with an end face of the first casing 510 at the second end 513 and with the second protrusion 532 snapping in the second notch 519.

Figure 28:
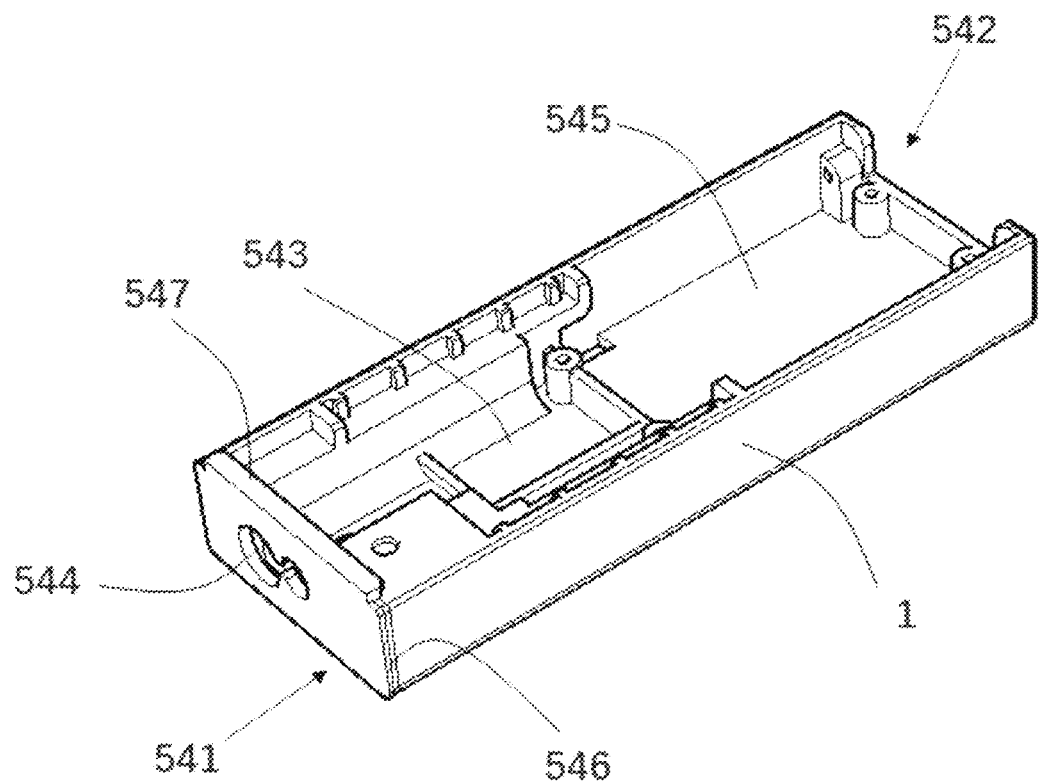
FIG. 28 is a schematic illustration of a holder in Embodiment 5 of the present invention.
Figure 29:
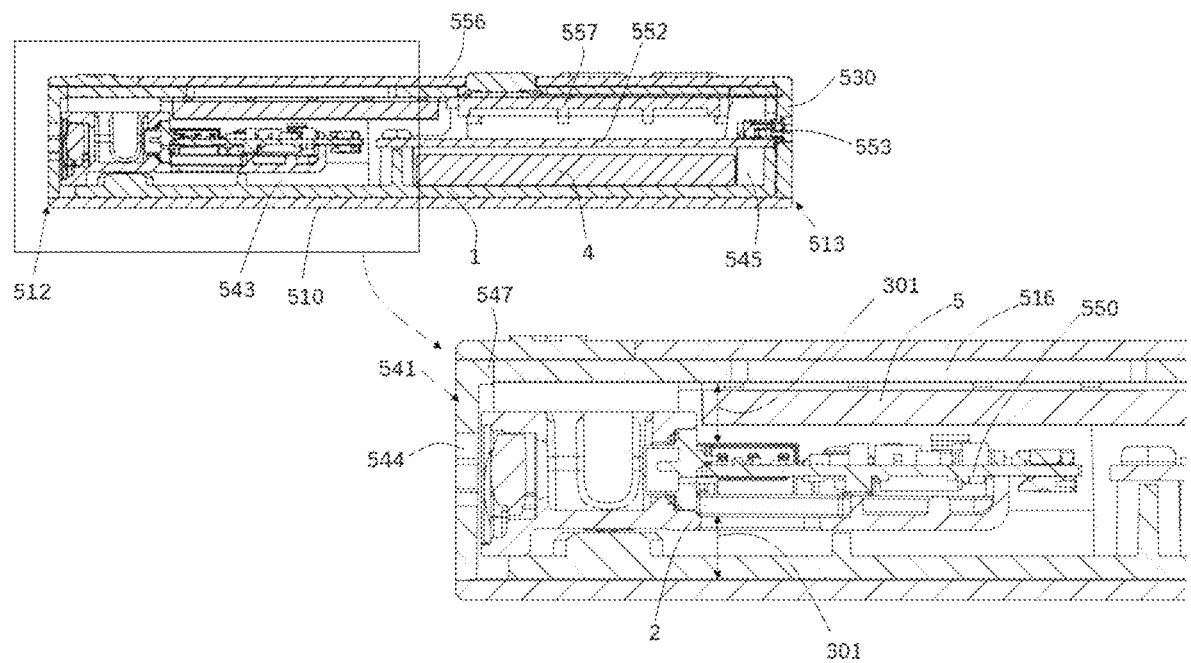
FIG. 29 is a schematic cross-sectional view of Embodiment 5 of the present invention.

As shown in FIG. 28, the holder 1 defines a first mounting groove 543 around the front end 541, in which the measuring part 2 is mounted and secured with a fastener disposed in opposition thereto. The measuring part 2 is of the same structure as in Embodiments 1 to 3 and, therefore, needs not be described in further detail herein. A laser port 544 is provided in an end face at the front end 541 of the holder. In operation, a laser beam for measurement is transmitted and received through the laser port 544. A display device 5 is provided around the middle of the holder 1, and a first circuit board 550 is provided under the display device 5. The first circuit board 550 is electrically connected to the measuring part 2, the display device 5, a battery 4, a button 551, etc. by connections such as wires. The holder 1 defines a second mounting groove 545 around a rear end 542 thereof, in which the battery 4 is received. A second circuit board 552 is provided above the battery 4 and is connected to a charging port 553 arranged at the rear end 542 of the holder 1. In this way, the components including the measuring part 2, the display device 5, the battery 4, the first circuit board 550, the second circuit board 552 and the button 551 are assembled on the holder 1 and form together therewith the inner core 10, which is assembled as a whole within the constant-diameter cavity 511 of the first casing 510. Since the measuring part 2, the display device 5, the circuit boards 550, 552, etc. are placed within the holder 1, during the assembly of the holder 1 into the first casing 510, the gap 301 is always present between the measuring part 2 and the first casing 510. Once the holder 1 is seated in place in the first casing 510, the display device 5 opposes the first housing through hole 516 and the second circuit board 552 opposes the second housing through hole 530. The holder 1 is provided at the front end 541 with radial lips 546 and a first protrusion 547. The first protrusion 547 matches the first notch 518 in shape.

Figure 27:
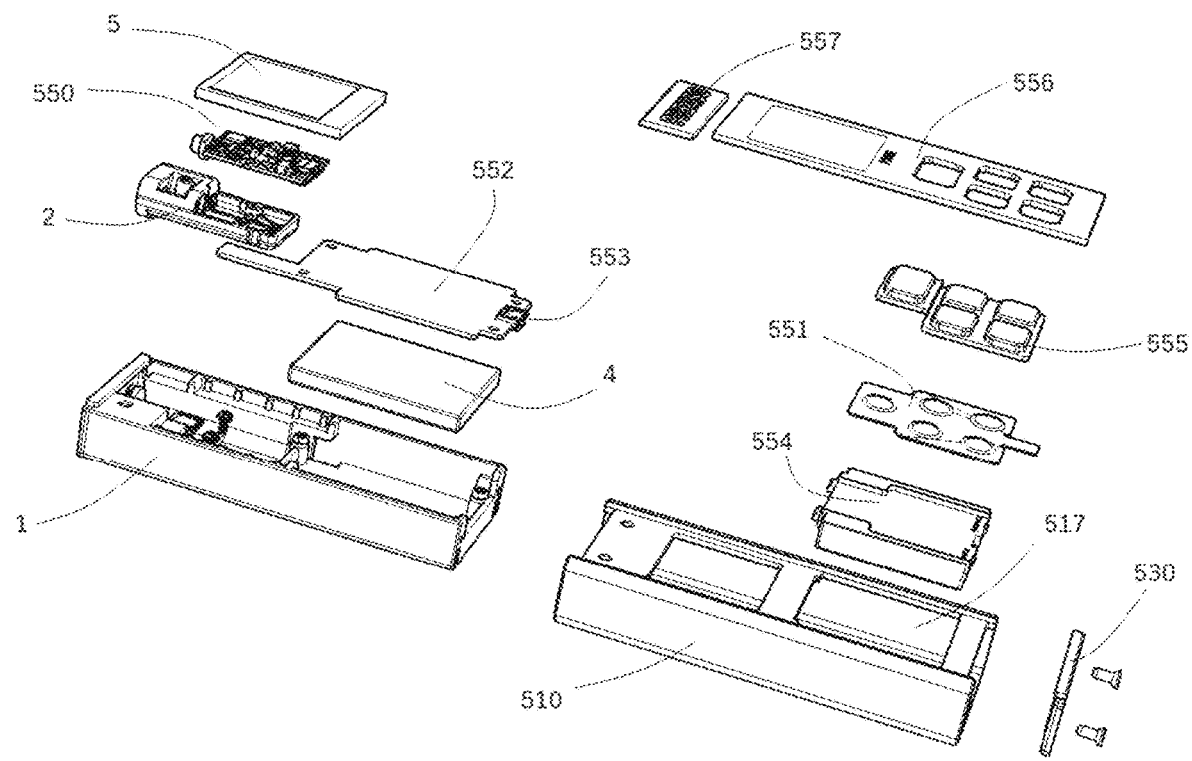
FIG. 27 is a schematic exploded view of Embodiment 5 of the present invention.

As shown in FIGS. 26 and 27, in order to assemble the inner core 10 into the constant-diameter cavity of the first casing 510, the holder is inserted at the rear end 542 into the constant-diameter cavity 511 through the first opening 514 of the first casing 510 and advanced so that the front end 541 of the holder approaches the first opening 514. That is, the front end 541 of the holder is configured to be proximate the first end 512 of the casing and the rear end 542 of the holder proximate the second end 513 of the casing. As shown in FIG. 28, the holder includes, at the front end 541 thereof, radial lips 546 and a first protrusion 547. The radial lips 546 are situated on opposing lateral sides of the front end 541 of the holder and radially extend outwardly, and the first protrusion 547 is located on an upper side of the front end 541 of the holder and is raised inwardly in the lengthwise direction. The front end 541 of the holder is deployed at the first end 512 of the casing so that the radial lips 546 closely contact side walls of the first opening 514. In this way, the front end 541 of the holder closely fits in the first opening 514 and is thereby laterally secured relative to the first casing 510. Moreover, the first protrusion 547 engages with the first notch 518 to form a barrier that stops further movement of the holder 1 into the cavity 511. The second casing 530 is coupled to the rear end 542 of the holder 1 by the fastener 531 so as to be flush with the end face of the first casing 510 at the second end 513. In addition, the second protrusion 532 is received in the second notch 519 so that the second casing 530 abuts against the casing. Thus, it works together with the first protrusion 547 to fix the holder 1 axially (in the lengthwise direction of the first casing 510). In this way, the inner core 10 is assembled and secured in the housing 3. The assembly of the holder 1 with the first casing 510 is detachable because the inner core 10 can be simply pushed out of the first casing 510 after the fastener 531 and the second casing 530 are removed. The measuring part 2 has undergone accuracy adjustment before it is assembled to the holder 1. During the assembly or removal of the inner core 10 into or from the first casing 510, the measuring part 2 will not come into contact with the first casing 510. An operator can accomplish the assembly simply by manipulating the holder 1 without touching the measuring part 2. This can ensure that the measuring part 2 maintains the same accuracy since it was delivered from the factory, dispensing with another accuracy adjustment process during the assembly or disassembly.

As shown in FIGS. 26 and 27, once the inner core 10 has been assembled with the housing 3, a button frame 554 is provided to cover and close the second housing through hole 517, and the button 551 is placed on the button frame 554. A button cap 555 is then provided on an external side of the first casing 510 in positional correspondence with the button 551. In this way, the button 551 is positioned above the second circuit board 553 and electrically connected to the second circuit board 553. After that, a panel 556 and an identification block 557 are secured in the depression 521 by an adhesive or otherwise. The panel 556 and the identification block 557 may be flush with the lips 520. A lower end of the panel 556 is aligned with the housing 3 and thus shades the first protrusion 547 and the first notch 518, and the an upper end of the identification block 557 is aligned with the first end 512 of the first casing 510 and thus shades the second protrusion 532 and the second notch 519. The panel 556 is provided with a panel through hole 559, out of which the button cap 555 protrudes and is exposed to facilitate manipulation, and a portion of the panel 556 in positional correspondence with the display device 5 is provided by a transparent window allowing information displayed on the display device 5 to be read.

Although the laser ranging apparatus of Embodiment 5 has a different overall appearance from that of Embodiments 1 to 3, both allow the holder 1 and the measuring part 2 to be assembled into the housing 3 as a whole. That is, the measuring part 2 is mounted to the holder 1 so that the two form an integral structure (the inner core 10), which is slid into or out of the housing 3, without requiring an operator to touch the measuring part 2 during the assembly and disassembly processes. Moreover, the measuring part 2 will not come into collision or contact with the housing 3, ensuring that the measuring part 2 can maintain the same accuracy since it was delivered from the factory and does not require any other accuracy adjustment process.

Figure 30:
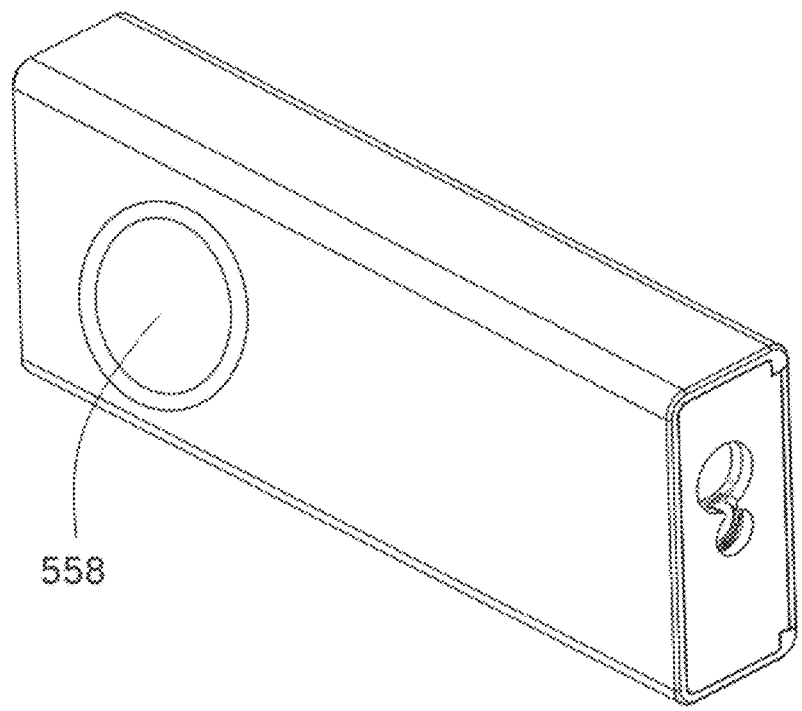
FIG. 30 is a schematic back view of Embodiment 5 of the present invention, showing an inductive charging area.

In this embodiment, the battery 4 is selected as a lithium battery, and the second circuit board 552 is provided thereon with a charging port 553, which may be implemented as a USB charging port or a type-C charging port. In some embodiments, a wireless charging technique, which employs, for example, conduction by a coil, may be selected. In this case, the holder 1 may be provided with an inductive charger. As shown in FIG. 30, an inductive charging area 558, for example, with a circular outline or charging indication may be provided on the housing 3.

Embodiment 6

In Embodiments 1 to 4, in the course of the holder 1 being slid into the first casing 31, in order to enable rapid location of the holder 1, the holder 1 is provided with a holder baffle 37, which, when abutting an end face of the first casing 31, places the holder 1 at a predetermined position. After that, the second casing 32 is coupled to the holder with a fastener, thereby axially securing the holder 1 relative to the housing 3. In Embodiment 5, in the course of the holder 1 being slid into the first casing 510, rapid location of the holder 1 is accomplished by fitting a first protrusion 547 provided at the rear end 542 of the holder into a first notch 518 on the housing 3. Use of such locating components such as the holder baffle 37 and the first protrusion 547 enables the holder 1 to rapidly slide into the housing 3 during assembly, thus resulting in an increase in assembly efficiency.

Figure 31:
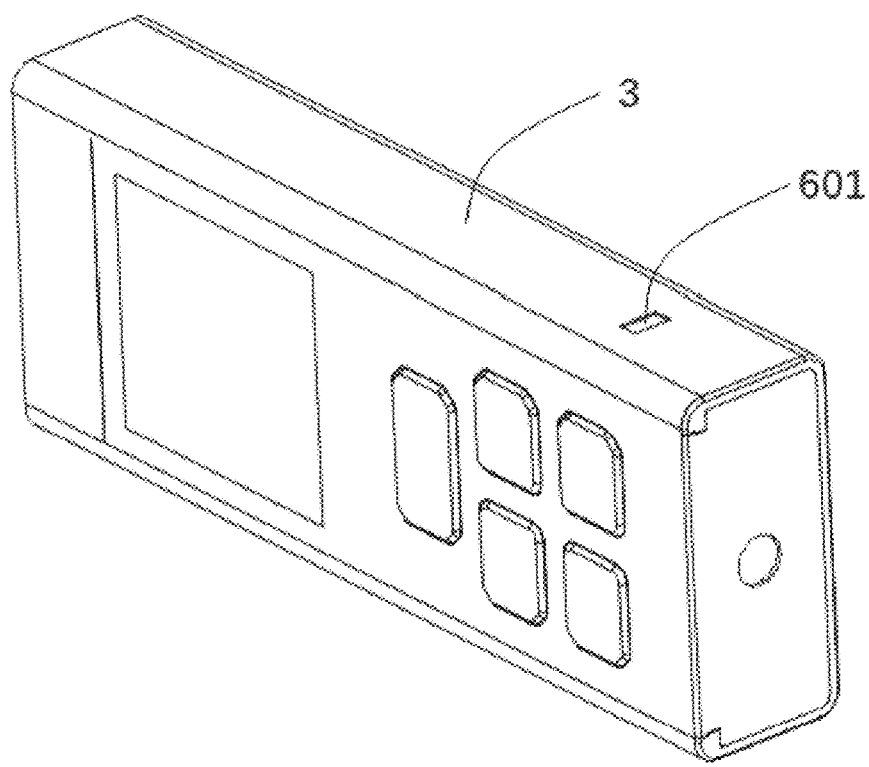
FIG. 31 is a schematic illustration of Embodiment 6 of the present invention, showing a recess in a side wall of a housing.
Figure 32:
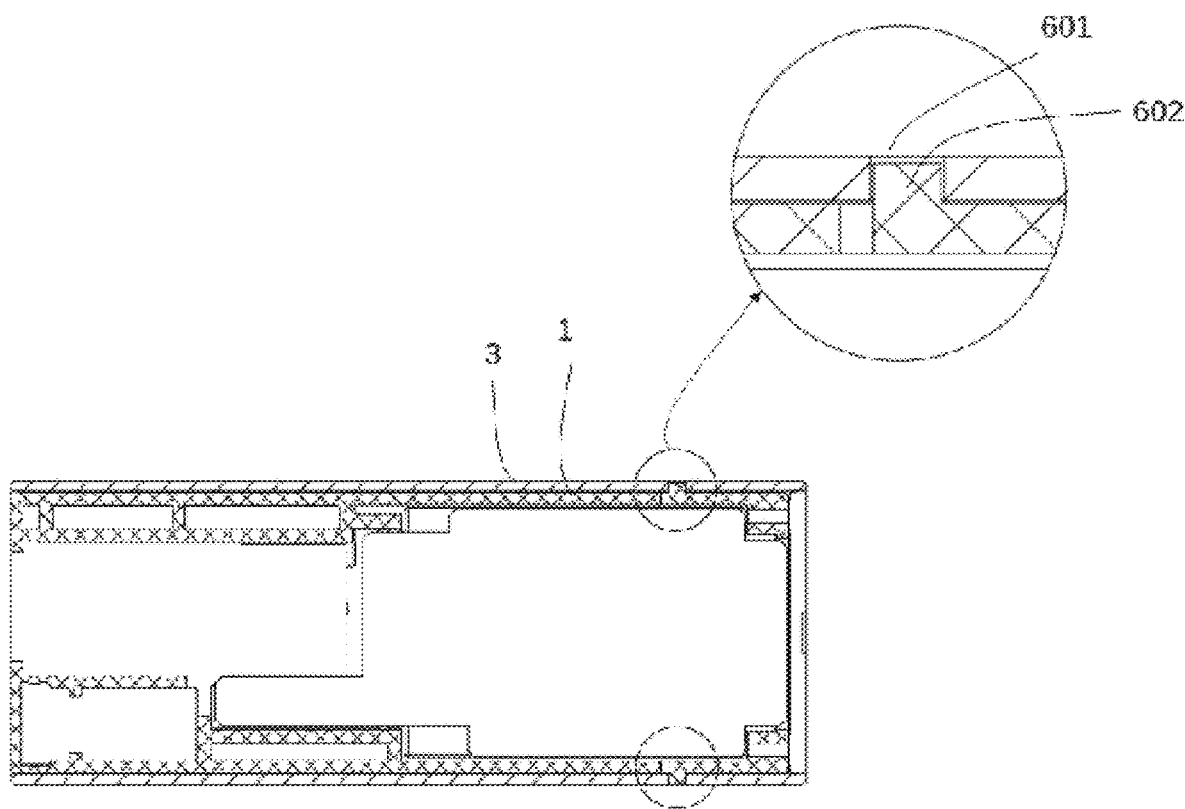
FIG. 32 is a schematic cross-sectional view of Embodiment 6 of the present invention, showing mating of snaps with recesses.

This embodiment provides a laser ranging apparatus, in which the holder is located and fastened in a different way from that used in Embodiments 1 to 5. As shown in FIGS. 31 and 32, snaps 602 are provided on side surfaces of the holder 1, and recesses 601 for mating with the snaps 602 are provided on the housing 3. The snaps 602 scan snap into the recesses 601. In use, the positions for the snaps 602 and the recesses 601 may be properly designed so that when the holder 1 slides into the housing 3, the snaps 602 move into opposition to, and enter, the recesses 601, thereby locating the holder 1 at a predetermined position and securing it in the housing 3. At this time, it may be no longer necessary to axially secure the holder 1, for example, by using a fastener. Therefore, according to Embodiment 6, the cooperation of the snaps 602 and the recesses 601 enables the assembly to be accomplished within one step without needing any additional operation. This results in a further increase in assembly efficiency.

Embodiment 7

In Embodiments 1 to 6, the first casing is an integral casing and may be configured to be open at either one or both ends, and the holder 1 and the measuring part 2 may be assembled, as a whole, into the integral casing through an opening. In this embodiment, instead of being an integral casing, the first casing is composed of two or more sections which are assembled together. FIGS. 33 to 36 show this embodiment.

Figure 33:
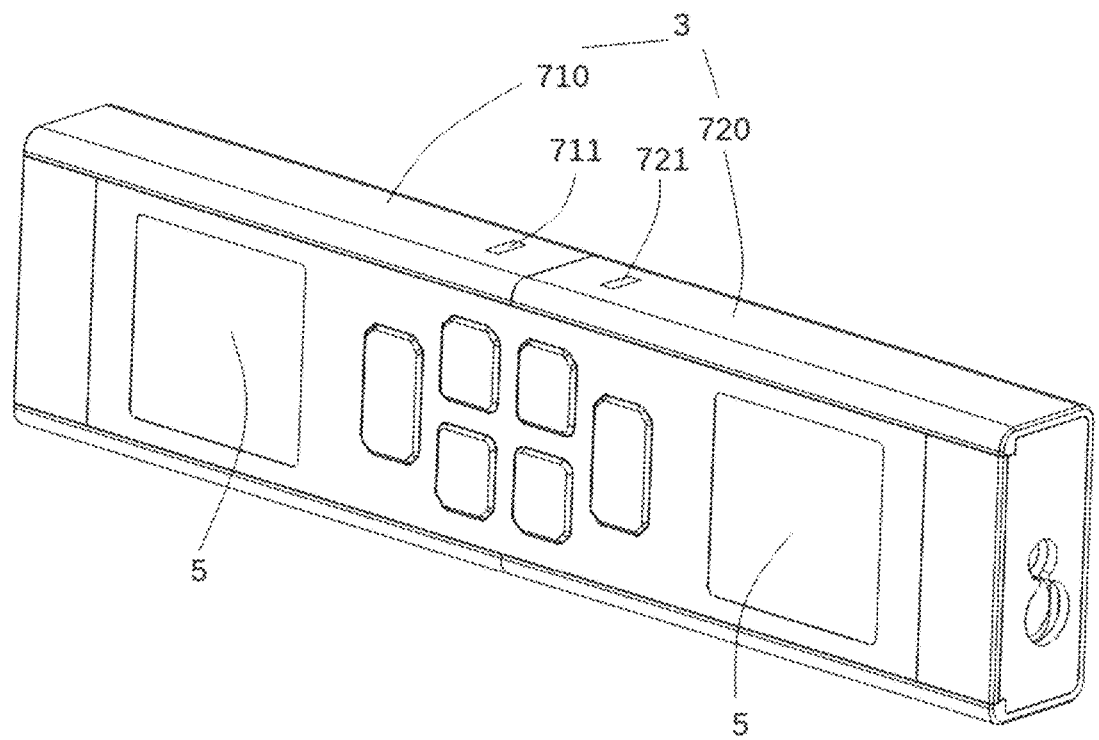
FIG. 33 is a schematic illustration of Embodiment 7 of the present invention.
Figure 34:
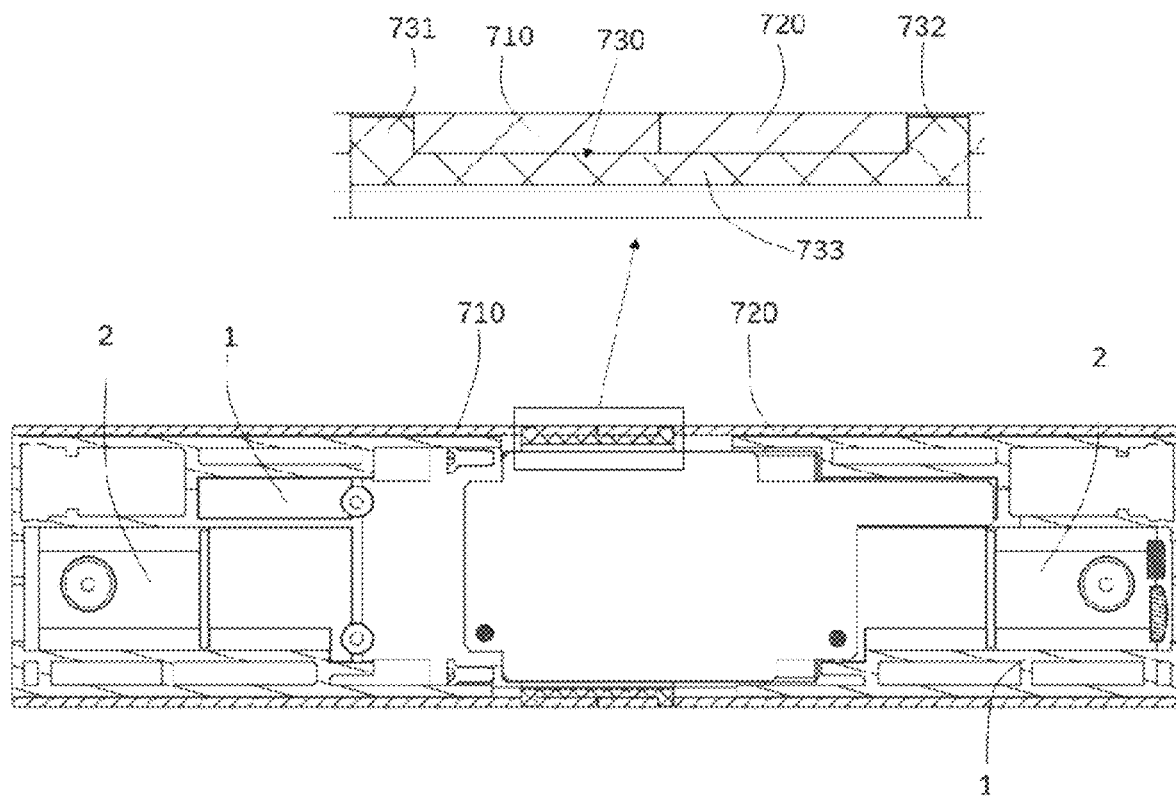
FIG. 34 is a schematic cross-sectional view of Embodiment 7 of the present invention, showing how a connecting member connects a left shell and a right shell.
Figure 35:
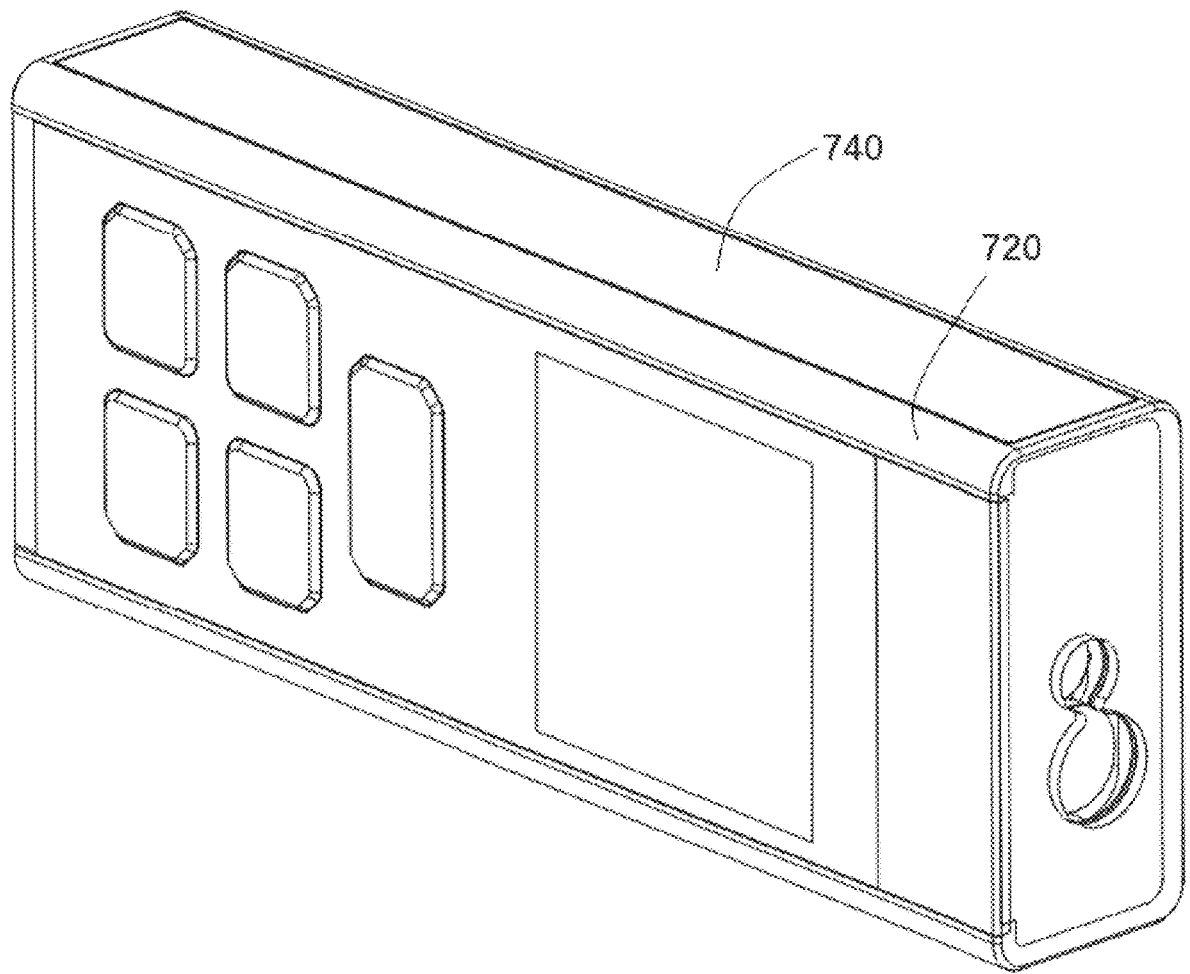
FIG. 35 is a schematic illustration of Embodiment 7 of the present invention, showing a sidewall cover plate.
Figure 36:
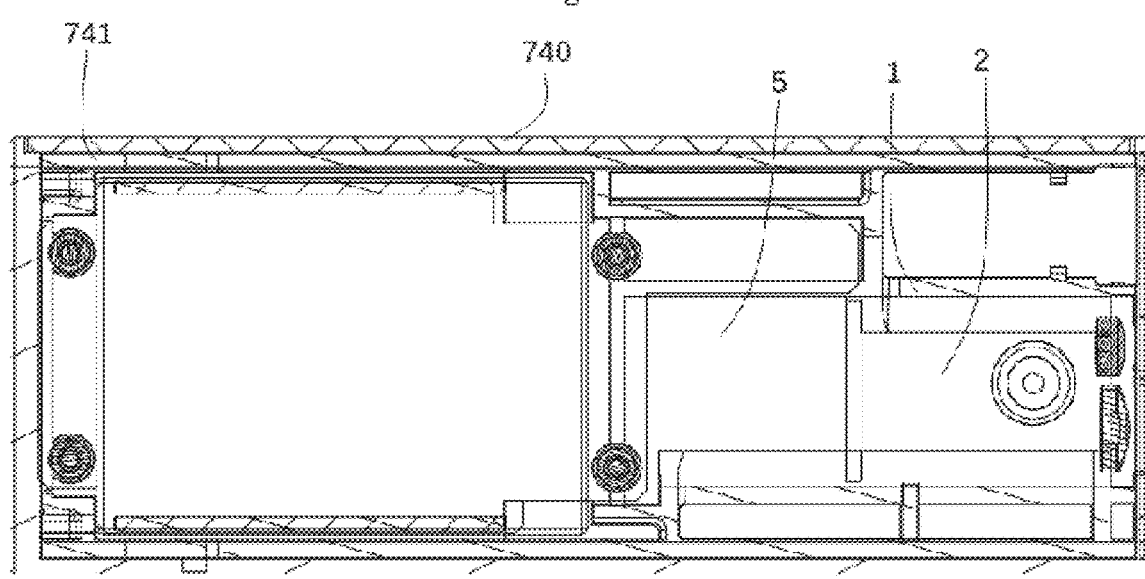
FIG. 36 is a schematic cross-sectional view of Embodiment 7 of the present invention, showing sidewall cover plates and sidewall openings.

As shown in FIGS. 33 and 34, the housing 3 includes two parts: a left shell 710 and a right shell 720. One end of the left shell 710 is coupled to one end of the right shell 720 so that they make up the housing 3 for accommodating the holder 1 therein. The left shell 710 is coupled to the right shell 720 by a connecting member 730.

In some embodiments, the connecting member 730 includes a first connecting portion 731, a second connecting portion 732 and a transverse portion 733 situated therebetween. The first connecting portion 731 and the second connecting portion 732 projects outwardly from the transverse portion 733. A first through hole 711 is provided in a side wall of the left shell 710, and a second through hole 721 is provided in a side wall of the right shell 720. The first connecting portion 731 of the connecting member 730 is inserted in the first through hole 711, and the second connecting portion 732 is inserted in the second through hole 721. In this way, the left shell 710 and the right shell 720 are coupled together to form the complete housing 3, which defines a cavity for accommodating the holder 1 and the measuring part 2.

The connecting member 730 may be disposed within the left shell 710 and the right shell 720 in such a manner that a surface of the transverse portion 733 of the connecting member 730 facing the cavity of the housing 3 is flush with inner surfaces of the left shell 710 and the right shell 720. This enables the cavity of the housing 3 has a constant diameter.

The left shell 710 and the right shell 720 are secured together by the connecting member 730, and the cavity is defined to accommodate the holder 1 and the measuring part 2. In some embodiments, only one combination of holder 1 and measuring part 2 may be accommodated. In this case, assembly may be accomplished in the same manner as in Embodiment 5 and, therefore, needs not be described in further detail herein. In some embodiments, as shown in FIG. 34, one combination of holder 1 and measuring part 2 is inserted in the left shell 710, and another combination of holder 1 and measuring part 2 is inserted in the right shell 720. The two combinations may share a common set of circuit boards and a common battery. With this configuration, both ends of the ranging apparatus can be used for ranging. In order to facilitate the assembly of the holders 1 in the left shell 710 and the right shell 720, openings are formed in side walls of the left shell 710 and the right shell 720 (parallel to a lengthwise direction thereof). The holders 1 may be assembled in the same fashion as in the preceding embodiments. That is, the holders 1 and the measuring parts 2 are assembled with displays 5 and other components to form inner cores, which are then respectively slid, as a whole, into the left shell 710 and the right shell 720. After that, sidewall cover plates 740 are provided to cover and close the sidewall openings 741. It is to be understood that it is also possible to provide openings at ends of the left shell 710 and the right shell 720 that oppose in the lengthwise direction. That is, they may each employ a structure similar to the housing structure of Embodiment 5. Since the sidewall openings 741 in the left shell 710 and the right shell 720 are identical, only that in the right shell 720 is illustrated in the figures as an exemplary embodiment of the sidewall openings 741.

It is to be noted that although the housing 3 has been described in this embodiment as being composed of the left shell 710 and the right shell 720 that are coupled together in the lengthwise direction. In other embodiments, it may also be composed of two parts coupled together in a widthwise direction, i.e., an upper shell and a lower shell. The upper shell and the lower shell are stacked in the widthwise direction and then secured to each other by a connecting member. Likewise, when coupled together, the upper shell and the lower shell define a cavity in which either only one combination of holder and measuring part or two separate combinations of holder and measuring part may be accommodated.

The housing of the laser ranging apparatus described in this embodiment can be composed of multiple parts as actually needed. This not only enables the housing to have an enlarged internal space, but allows the ranging apparatus to incorporate, if necessary, two or more measuring parts.

Embodiment 8

In Embodiments 1 to 5, the laser ranging apparatuses are only capable of one-way ranging. In Embodiment 7, a left shell and a right shell may be coupled together and two separate measuring parts may be mounted therein to provide two-way laser ranging. In this embodiment, the laser ranging apparatus may have expanded functionality by combining laser ranging and other measuring functions.

Figure 37:
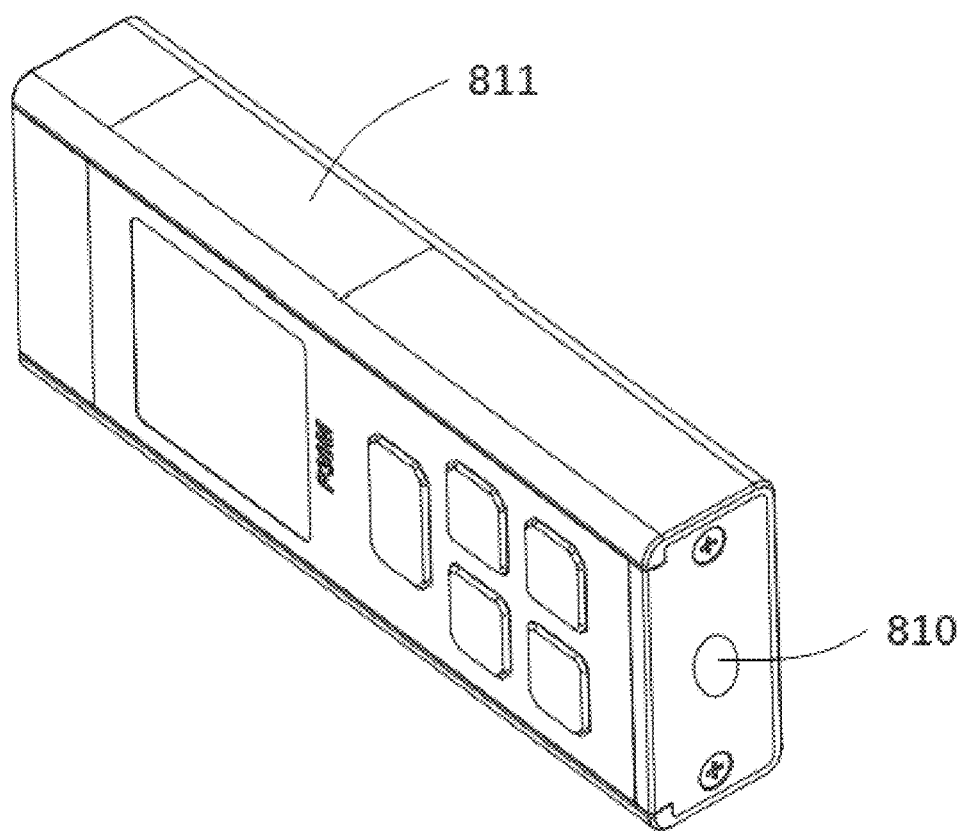
FIG. 37 is a schematic illustration of Embodiment 8 of the present invention, showing a second display device on a side wall.
Figure 38:
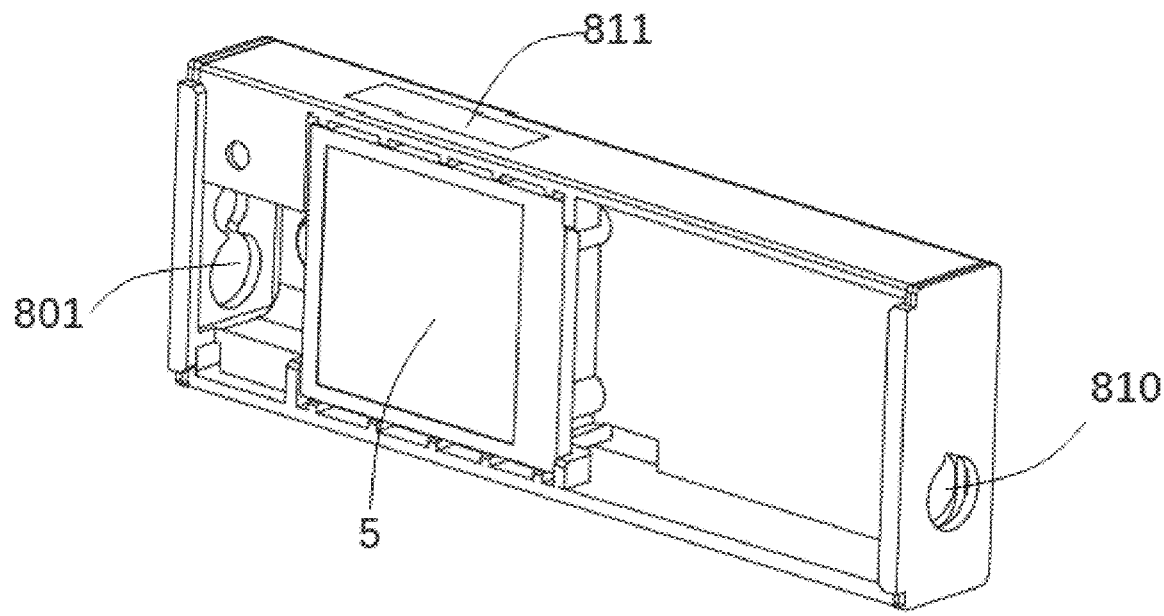
FIG. 38 is a schematic interior view of Embodiment 8 of the present invention, showing two display devices.
Figure 39:
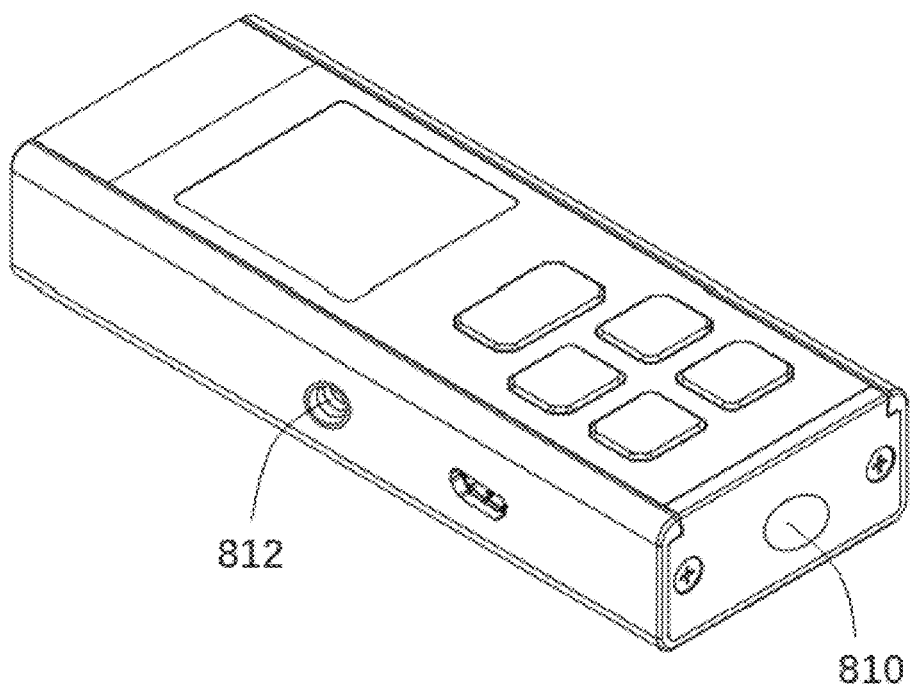
FIG. 39 is a schematic illustration of Embodiment 8 of the present invention, showing a support interface.

In some embodiments, as shown in FIGS. 37 to 39, any of the laser ranging apparatuses in Embodiments 1 to 7 may be added with a laser line projection function. For example, as shown in FIGS. 37 and 38, a laser line projection component may be added to the laser ranging apparatus of Embodiment 5. In the housing 3, laser ranging port 801 is provided at one end, and a laser line projection port 810 is provided at an opposing end. Moreover, line projection parameters may be displayed on the display device 5, including but not limited to, electronic horizontal angle, vertical angle and distance measurement values. For example, in the structure of Embodiment 7 in which the left shell 710 and the right shell 720 are coupled together, a laser ranging member may be arranged in the left shell 710, and a laser line projection component may be arranged in the right shell 720. In some other embodiment, a second display device 811 for displaying the line projection parameters thereon is provided in the laser ranging apparatus. As shown in FIG. 38, the second display device 811 may be provided on a side wall of the laser ranging apparatus, and the line projection port 810 is provided at one end of the laser ranging apparatus in the lengthwise direction. With this design, an operator can check electronic horizontal and vertical angles and other parameters with the second display device 811 during operation. Compared with the display device 5 on the front side, easier observation is allowed. In some embodiments, as shown in FIG. 39, a support interface 812 may be provided on a side wall of the housing 3 in the laser ranging apparatus. The support interface 812 may be coupled to an external support means, thereby securing the laser ranging apparatus to the support means. In this way, an operator is exempted from having to hold it by hand. This can reduce vibration caused by human intervention, which may adversely affect test results.

Figure 40:
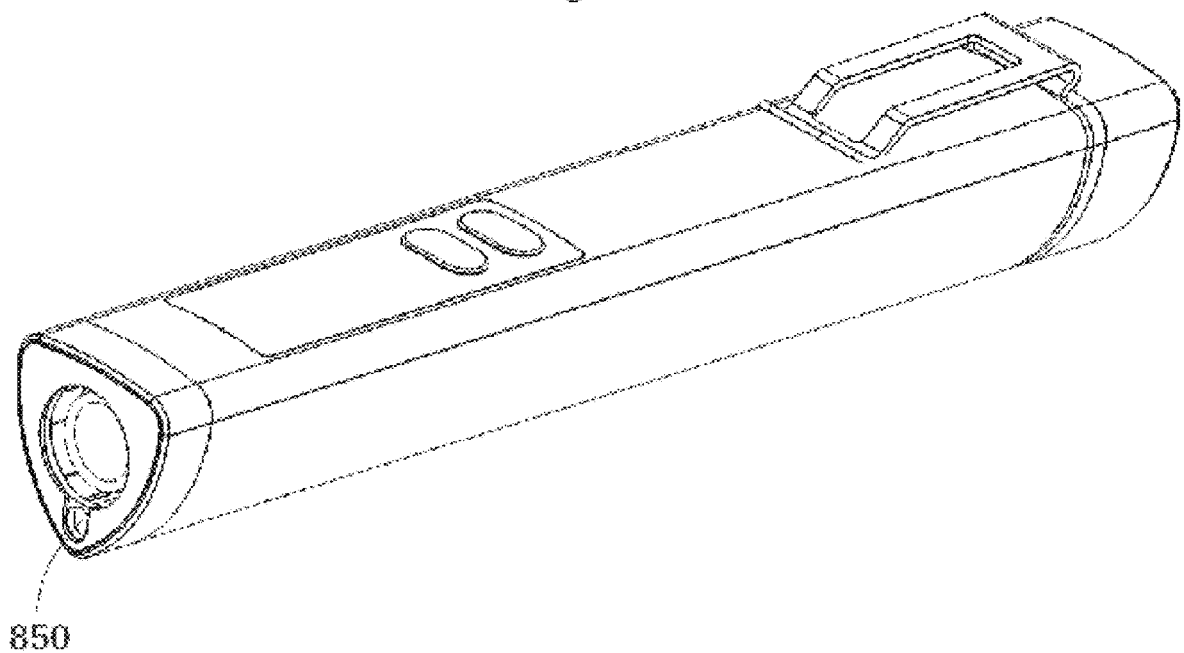
FIG. 40 is a schematic illustration of Embodiment 8 of the present invention, showing a temperature measurement member.

In some embodiments, any of the laser ranging apparatuses in Embodiments 1 to 7 may be further added with a temperature measuring function. For example, in the structure of FIG. 27 in which the left and right shells are coupled together to form the housing, the measuring part of the laser ranging apparatus may be arranged in one shell, and a temperature measurement member may be arranged in the other shell. Thus, the device combines laser ranging and temperature measuring functions. It is also possible that the measuring part of the laser ranging apparatus and the temperature measurement member 850 may be arranged in the same shell. As shown in FIG. 40, this embodiment utilizes infrared radiation for temperature measuring. The temperature measurement member may be implemented as a temperature measuring device known in the art. Similar to the assembly process for the laser ranging apparatus in any of Embodiments 1 to 7, the temperature measurement member may be mounted to the holder, and the two may be then slid into the housing as a whole.

In some embodiments, any of the laser ranging apparatuses in Embodiments 1 to 7 may be further added with a humidity measuring function. For example, as shown in FIG. 40, a humidity sensor (not shown) may be arranged in the housing, and the housing may be provided with a number of vent holes 820 capable of facilitating circulation of air through the humidity sensor. In this way, humidity of ambient air can be measured.

Figure 41:
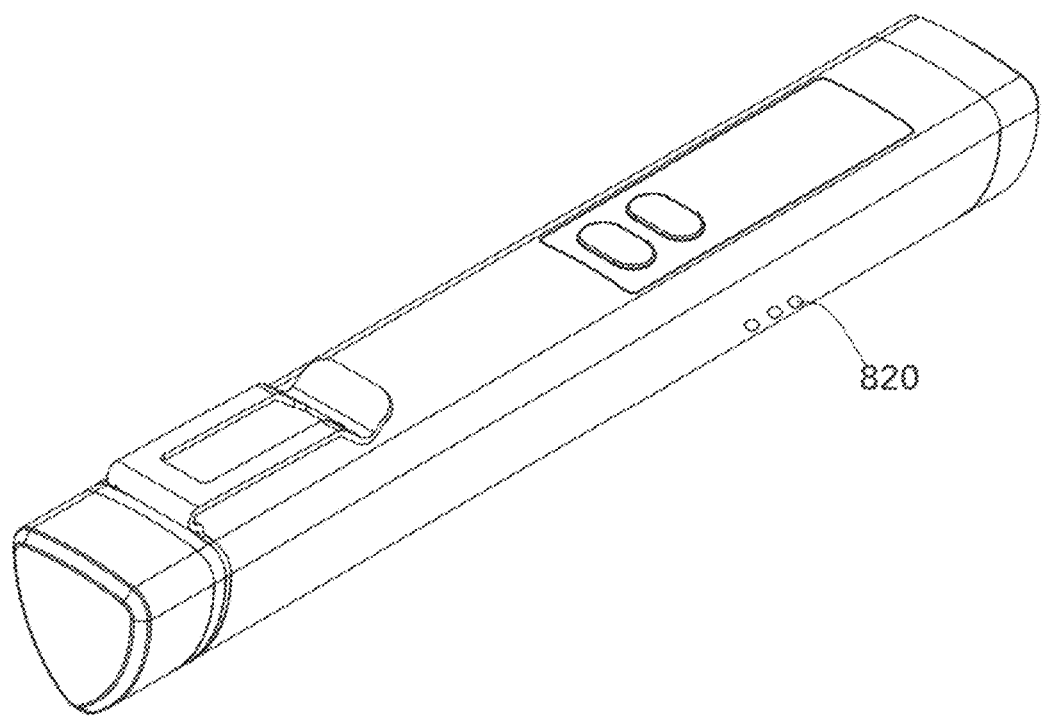
FIG. 41 is a schematic illustration of Embodiment 8 of the present invention, showing vent holes.
Figure 42:
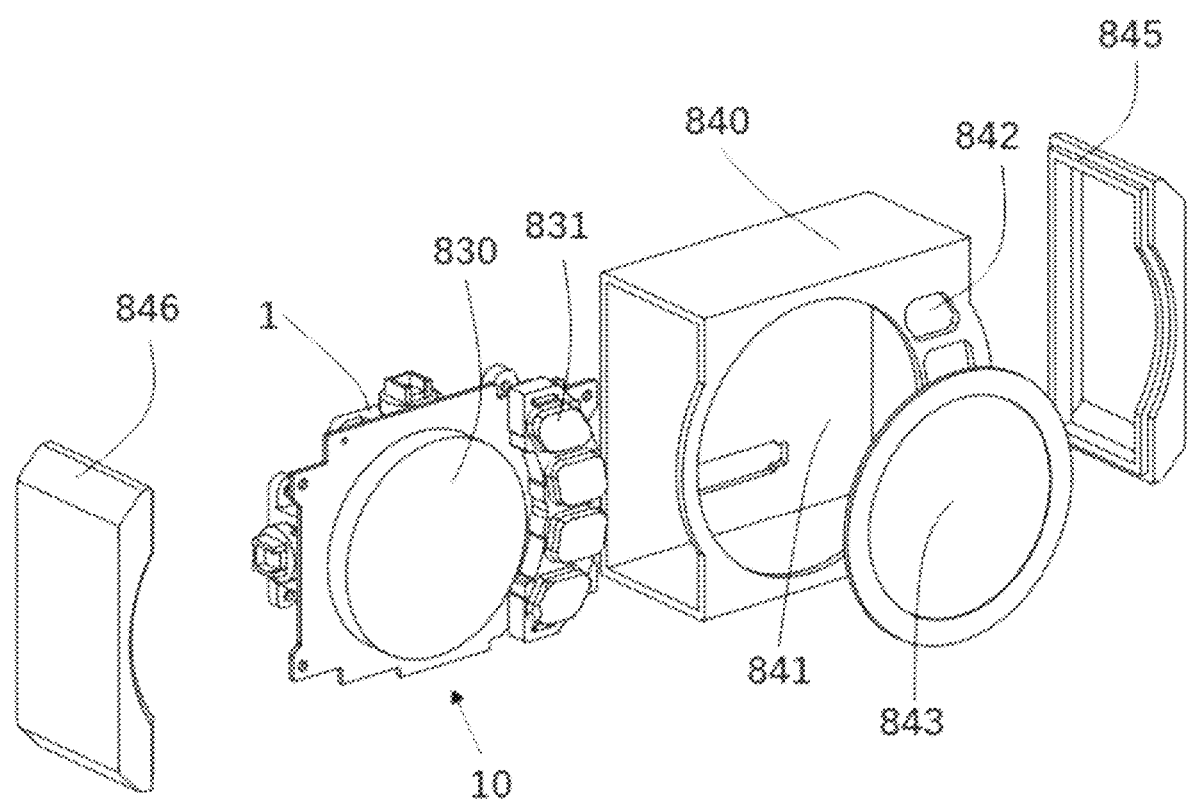
FIG. 42 is schematic exploded view of Embodiment 8 of the present invention, showing a circular display device.
Figure 43:
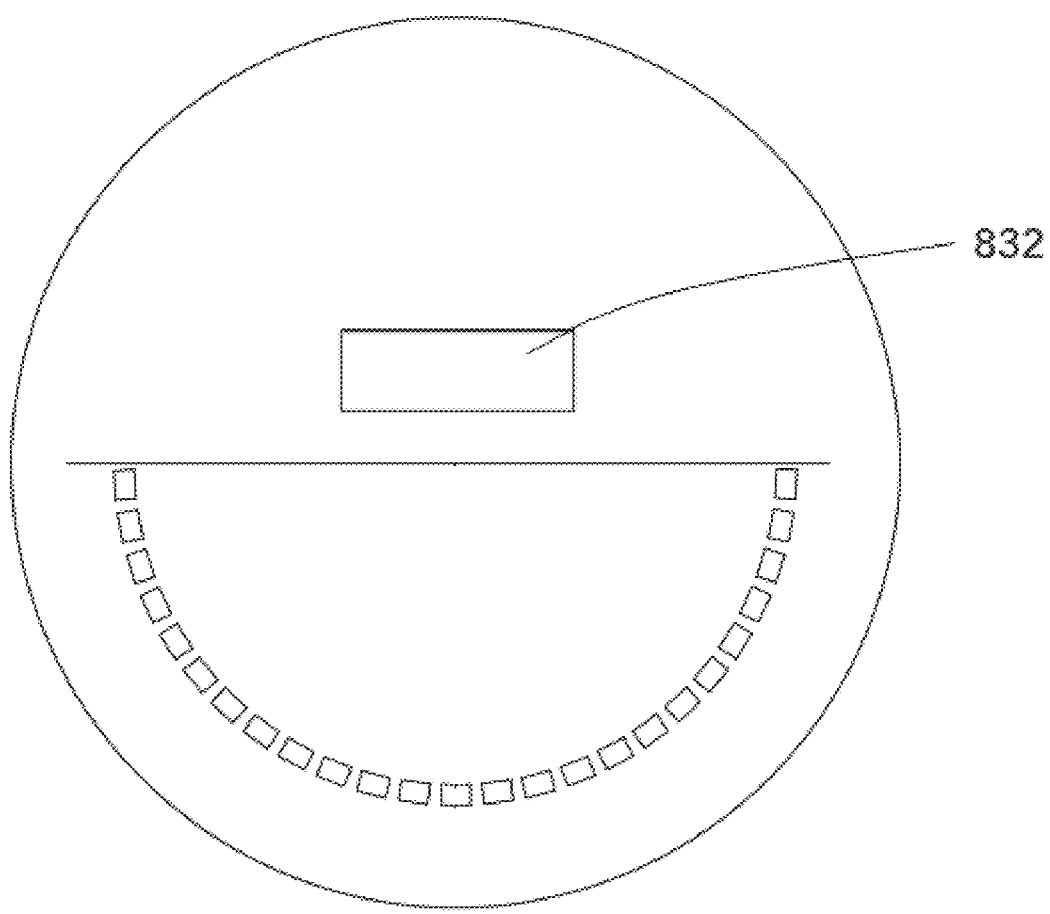
FIG. 43 shows an interface displayed on the circular display device in Embodiment 8 of the present invention.
Figure 44:
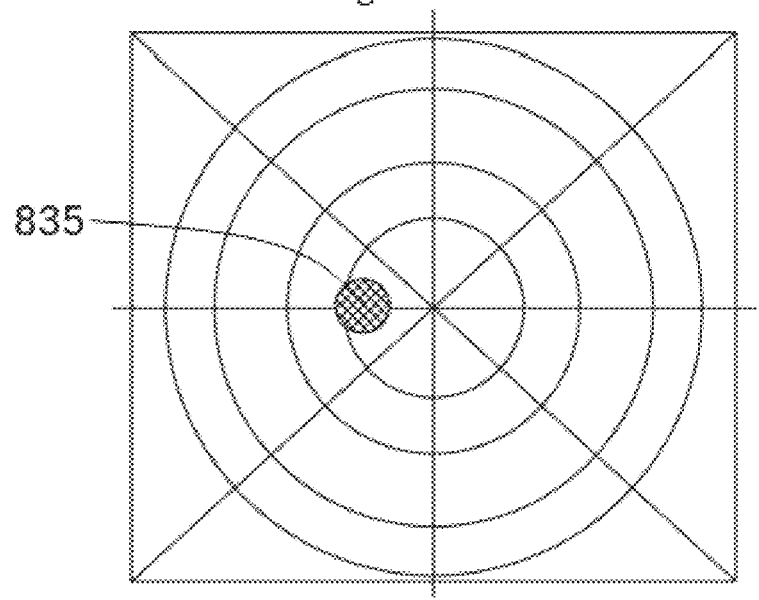
FIG. 44 is another interface displayed on the circular display device in Embodiment 8 of the present invention.
Figure 45:
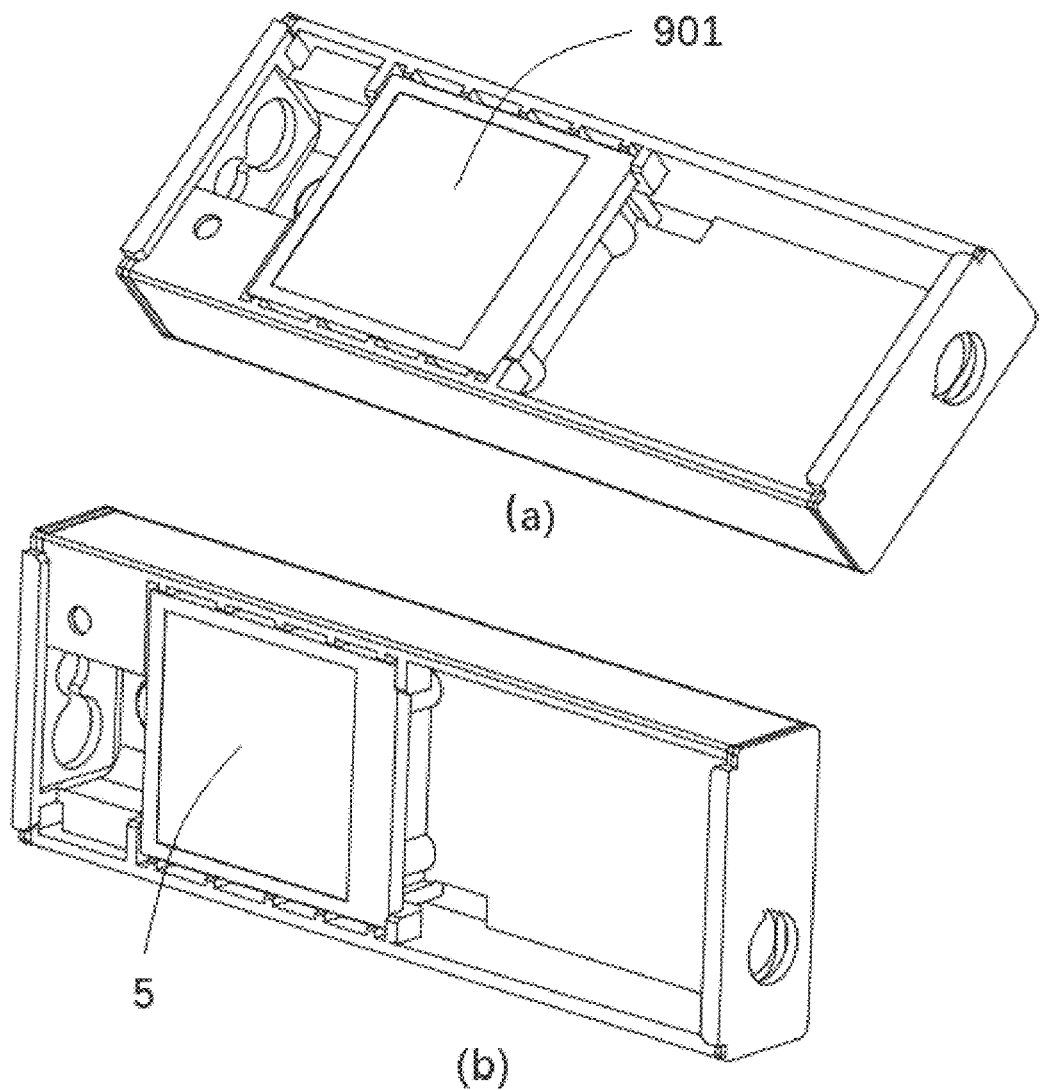
FIG. 45 schematically illustrates two display devices mounted on front and back sides of Embodiment 9 of the present invention.

In some embodiments, any of the laser ranging apparatuses in Embodiments 1 to 7 may be further added with the function of a level. As shown in FIG. 41, the measuring part of the laser ranging apparatus may be assembled together with an electronic level to the holder 1 to form an inner core 10, which is then slid into a first casing 840. A first end cap 845 and a second end cap 846 are provided to cover and close openings at opposing ends of the first casing 840. The holder 1 is provided with a circular display device 830 and a button 831, and the first casing 840 is provided with a circular through hole 841 and a button through hole 842. Once the holder 1 is slid in place in the first casing 840, the circular through hole 841 opposes the circular display device 830 and the button through hole 842 opposes the button 831. A transparent circular cover plate 843 is then provided to cover and close the circular through hole 841, and a button cap is passed through the button through hole 842 and arranged over the button 831. As shown in FIG. 42, the circular display device 830 can display thereon distance and angle values 832 and a graphic representation of a pointer indicating an electronic angle. Further, as shown in FIG. 44, the circular display device 830 may additionally display thereon an electronic bubble 835 indicating a current degree of levelness.

Embodiment 9

This embodiment explains how to arrange multiple displays on a laser ranging apparatus.

As shown in FIG. 38, in addition to a display device 5 mounted on a front side of a housing, a second display device 811 may be mounted on a side all of the housing 3.

As shown in FIG. 33, in case of the housing being composed of a left shell 710 and a right shell 720, each of the left and right shells 710, 720 may be provided thereon with a display device 5. It is to be understood that it is also possible to provide separate displays on side walls of the left shell 710 and the right shell 720, similar to as shown in FIG. 38.

As shown in FIG. 44, in addition to the display device 5 on the front side of the housing, a second display device 901 may be mounted on a back side of the housing.

The above is only the preferred embodiments of the present invention, and those skilled in the art may make improvements and modifications to the above technical solutions without departing from the principle of the present invention, and these improvements and modifications should also be regarded as the scope of the present invention.

The invention claimed is:

1. A laser ranging apparatus, comprising:
a housing comprising a first casing;
an inner core comprising a holder and a first measuring part mounted on the holder, the inner core detachably mounted in the first casing, the first casing covering at least part of the inner core, the first measuring part configured to measure a distance using laser light;
wherein the laser ranging apparatus is configured so that the inner core is, as a whole, assembled into the first casing or disassembled from the first casing;
wherein the inner core is provided with a display device, and the first casing is provided with a through hole in positional correspondence with the display device, once the inner core is mounted in place in the first casing, the display device opposes the through hole, and the display device is configured to display thereon an angle value and an electronic bubble.

2. The laser ranging apparatus of claim 1, wherein the first casing is cylindrical in shape and has at least one opening, and the inner core enters the first casing through an opening, or is removed therefrom through the opening, as a whole.

3. The laser ranging apparatus of claim 2, wherein the laser ranging apparatus comprises a locating structure configured to locate the inner core in an axial direction of the first casing during assembly of the inner core into the first casing.

4. The laser ranging apparatus of claim 3, wherein the locating structure comprises a holder baffle disposed on the holder, which comes into abutment against an end of the first casing during the assembly of the inner core into the first casing, thereby locating the inner core in the axial direction of the first casing.

5. The laser ranging apparatus of claim 4, wherein the laser ranging apparatus comprises a clamping member having a portion fixedly connected to the holder or the first casing and a portion disposed on an outer surface of the first casing.

6. The laser ranging apparatus of claim 5, wherein the clamping member comprises a stopper portion and a movable portion, the stopper portion fixedly connected to the holder or the first casing, one end of the movable portion joined to the stopper portion, another end of the movable portion disposed on an outer surface of the first casing and being movable.

7. The laser ranging apparatus of claim 6, wherein the stopper portion is disposed over the holder and located between the holder baffle and the first casing.

8. The laser ranging apparatus of claim 6, wherein the stopper portion is disposed over the holder and located between the holder baffle and a third casing coupled to one end of the holder.

9. The laser ranging apparatus of claim 3, wherein the locating structure comprises a first protrusion disposed at one end of the holder and a first notch provided in the first casing and is configured so that the first protrusion engages into the first notch during the assembly of the inner core into the first casing, thereby locating the inner core in the axial direction of the first casing.

10. The laser ranging apparatus of claim 3, wherein the locating structure comprises a snap disposed on a side wall of the holder and a recess provided in the first casing, the snap configured to snap into the recess during the assembly of the inner core into the first casing, thereby locating the inner core in the axial direction of the first casing.

11. The laser ranging apparatus of claim 2, wherein the first casing is composed of a plurality of portions which are joined together.

12. The laser ranging apparatus of claim 11, wherein the first casing comprises a left shell and a right shell, the left shell coupled, at one end in a lengthwise direction thereof, by a connecting member, to one end of the right shell at a lengthwise direction thereof.

13. The laser ranging apparatus of claim 12, wherein the left shell is provided with a first through hole, the right shell is provided with a second through hole, and the connecting member comprises a first connecting portion capable of being inserted into the first through hole, a second connecting portion capable of being inserted into the second through hole and a transverse portion joined to both the first connecting portion and the second connecting portion.

14. The laser ranging apparatus of claim 12, wherein each of the left shell and the right shell is mounted therein with one inner core, making the laser ranging apparatus capable of laser ranging at both ends.

15. The laser ranging apparatus of claim 1, wherein the laser ranging apparatus further comprises a second measuring part.

16. The laser ranging apparatus of claim 15, wherein the second measuring part comprises a laser line projection component, the laser line projection component comprising a laser line projection port arranged in the housing, the laser line projection component configured to measure a degree of levelness and an angle.

17. The laser ranging apparatus of claim 15, wherein the second measuring part comprises a temperature measurement member configured to measure a temperature.

18. The laser ranging apparatus of claim 15, wherein the second measuring part comprises a humidity sensor and the first casing is provided with vent holes for causing circulation of air through the humidity sensor to enable it to measure humidity thereof.

19. The laser ranging apparatus of claim 15, wherein the second measuring part comprises an electronic level mounted on the holder as part of the inner core.

20. The laser ranging apparatus of claim 1, wherein the laser ranging apparatus comprises at least one display device mounted on the inner core, and at least one through hole is provided in the first casing in positional correspondence with the at least one display device.

21. The laser ranging apparatus of claim 20, wherein the laser ranging apparatus comprises a first display device disposed on a front side of the inner core and a second display device disposed on a lateral side perpendicular to the front side.

22. The laser ranging apparatus of claim 20, wherein the laser ranging apparatus comprises a first display device disposed on a front side of the inner core and a second display device disposed on a back side opposing the front side.

23. The laser ranging apparatus of claim 1, wherein the inner core is further provided thereon with a battery.

24. The laser ranging apparatus of claim 23, wherein the battery is a rechargeable battery.

25. The laser ranging apparatus of claim 24, wherein the housing is provided therein with a charging port, which is electrically connected to the rechargeable battery in order to charge the rechargeable battery.

26. The laser ranging apparatus of claim 24, wherein the laser ranging apparatus comprises an inductive charger and the housing is provided with an inductive charging area, the inductive charger configured to charge the rechargeable battery in a wireless manner.

\* \* \* \* \*